US010146365B2

(12) United States Patent
Takahashi et al.

(10) Patent No.: US 10,146,365 B2
(45) Date of Patent: Dec. 4, 2018

(54) DISPLAY DEVICE WITH TOUCH DETECTION FUNCTION

(71) Applicant: Japan Display Inc., Tokyo (JP)

(72) Inventors: Keiichiro Takahashi, Tokyo (JP); Masahiro Tokita, Tokyo (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 15/297,875

(22) Filed: Oct. 19, 2016

(65) Prior Publication Data

US 2017/0131829 A1 May 11, 2017

(30) Foreign Application Priority Data

Nov. 10, 2015 (JP) .................................. 2015-220740

(51) Int. Cl.
*G06F 3/00* (2006.01)
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04101* (2013.01)

(58) Field of Classification Search
CPC ....... G06F 3/0416; G06F 3/0412; G06F 3/044
See application file for complete search history.

(56) References Cited

U.S. PATENT DOCUMENTS

| 5,825,345 A * | 10/1998 | Takahama | G06F 3/0412 345/104 |
|---|---|---|---|
| 9,569,035 B1 * | 2/2017 | Lee | G06F 3/0416 |
| 9,645,690 B1 * | 5/2017 | Konovalov | G06F 3/0418 |
| 2010/0214259 A1 * | 8/2010 | Philipp | G06F 3/0416 345/174 |
| 2012/0056834 A1 * | 3/2012 | Kim | G06F 3/0418 345/173 |
| 2012/0194471 A1 * | 8/2012 | Park | G06F 3/0418 345/174 |
| 2013/0234985 A1 * | 9/2013 | Huang | G06F 3/044 345/174 |
| 2014/0152617 A1 | 6/2014 | Kida et al. | |

(Continued)

FOREIGN PATENT DOCUMENTS

JP 2014-132445 A 7/2014

*Primary Examiner* — Kevin M Nguyen
(74) *Attorney, Agent, or Firm* — K&L Gates LLP

(57) ABSTRACT

According to an aspect, a display device with a touch detection function performs image display and touch detection in a time division manner in one frame period. The display device includes: a plurality of pixel electrodes arranged in a matrix in a display region in which an image is displayed; a display function layer having an image display function for displaying an image in the display region; a plurality of touch detection electrodes opposed to the pixel electrodes; and a detection unit that performs noise detection. The one frame period includes a plurality of display operation periods for displaying the image and a plurality of detection operation periods for performing at least touch detection. The detection unit performs the noise detection in a period that is included in the detection operation period and shorter than one of the detection operation periods in the one frame period.

14 Claims, 22 Drawing Sheets

(56) References Cited

U.S. PATENT DOCUMENTS

| | | | |
|---|---|---|---|
| 2015/0077387 A1* | 3/2015 | Han | G06F 3/044 345/174 |
| 2015/0077394 A1* | 3/2015 | Dai | G06F 3/0416 345/174 |
| 2016/0011695 A1* | 1/2016 | Kim | G06F 3/044 345/174 |
| 2016/0188142 A1* | 6/2016 | Oh | G09G 3/36 345/174 |

* cited by examiner

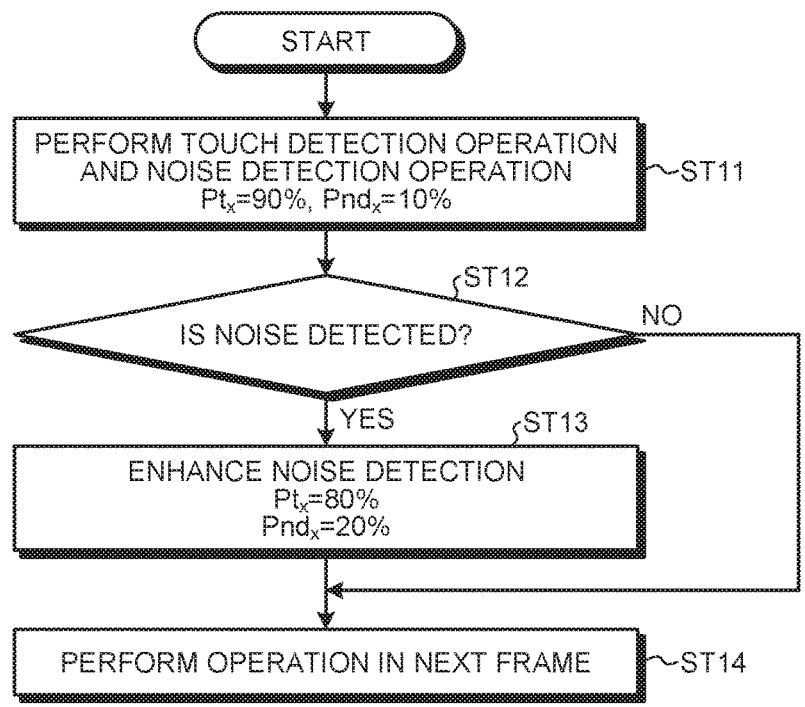
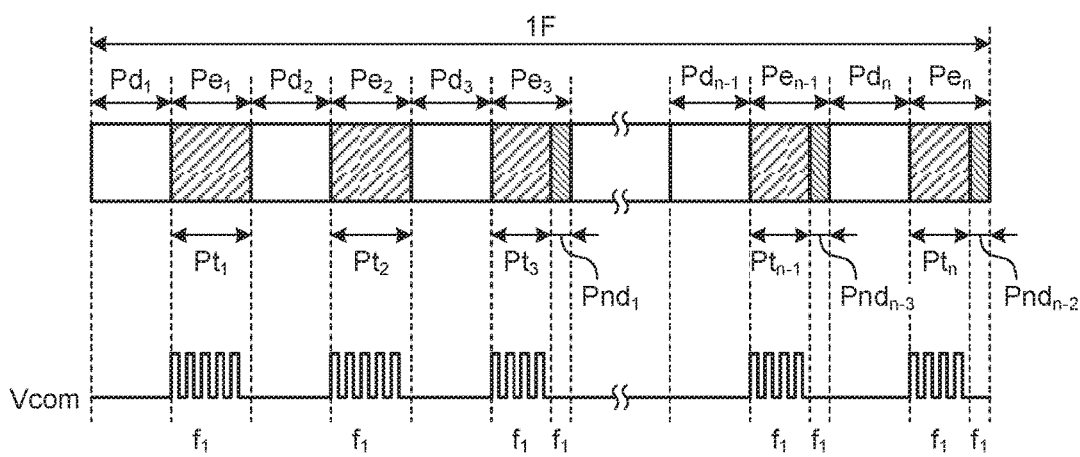

DISPLAY DEVICE WITH TOUCH DETECTION FUNCTION

CROSS-REFERENCE TO RELATED APPLICATIONS

This application claims priority from Japanese Application No. 2015-220740, filed on Nov. 10, 2015, the contents of which are incorporated by reference herein in its entirety.

BACKGROUND

1. Technical Field

The present invention relates to a display device with a touch detection function that can detect an external proximity object.

2. Description of the Related Art

In recent years, attention has been paid to a touch detection device that can detect an external proximity object, what is called a touch panel. The touch panel is mounted on a display device such as a liquid crystal display device, or integrated with the display device to be used as a display device with a touch detection function. In the display device with a touch detection function, various button images and the like are displayed on the display device, so that the touch panel is used, in place of a typical mechanical button, for inputting information. Japanese Patent Application Laid-open Publication No. 2014-132445 discloses a touch detection unit that performs touch detection by sampling a detection result of a touch detection element at a timing synchronized with a touch driving signal, and a noise detection unit that detects noise included in a frequency component sampled by the touch detection unit.

However, a method of shortening a noise detection time and a method of enhancing a noise detection function have been demanded to further improve a noise detection technique.

For the foregoing reasons, there is a need for a display device with a touch detection function that can perform a preferable touch detection operation and noise detection operation in accordance with the usage of the display device with a touch detection function.

SUMMARY

According to an aspect, a display device with a touch detection function performs image display and touch detection in a time division manner in one frame period for displaying an image corresponding to one screen. The display device includes: a plurality of pixel electrodes arranged in a matrix in a display region in which an image is displayed; a display function layer having an image display function for displaying an image in the display region; a plurality of touch detection electrodes opposed to the pixel electrodes; and a detection unit that performs noise detection. The one frame period includes a plurality of display operation periods for displaying the image and a plurality of detection operation periods for performing at least touch detection. The detection unit performs the noise detection in a period that is included in the detection operation period and shorter than one of the detection operation periods in the one frame period.

According to another aspect, a display device with a touch detection function performs image display and touch detection in a time division manner in one frame period for displaying an image corresponding to one screen. The display device includes: a plurality of pixel electrodes arranged in a matrix in a display region in which an image is displayed; a display function layer having an image display function for displaying an image in the display region; a plurality of touch detection electrodes opposed to the pixel electrodes; and a touch detection unit that detects an output signal of the touch detection electrode. The one frame period includes a plurality of display operation periods for displaying the image and a plurality of detection operation periods for performing the touch detection. The touch detection electrode is electrically coupled to the touch detection unit in the detection operation period. At least one of the detection operation periods includes a period in which a touch detection drive signal for performing touch detection is not applied to the touch detection electrode.

BRIEF DESCRIPTION OF THE DRAWINGS

FIG. 15 is a flowchart for explaining a touch detection operation and a noise detection operation according to the first embodiment;

FIG. 16 is a schematic diagram illustrating a relation between the display operation period, the touch detection period, and the noise detection period in one frame period according to a modification of the first embodiment;

DETAILED DESCRIPTION

Figure 1:
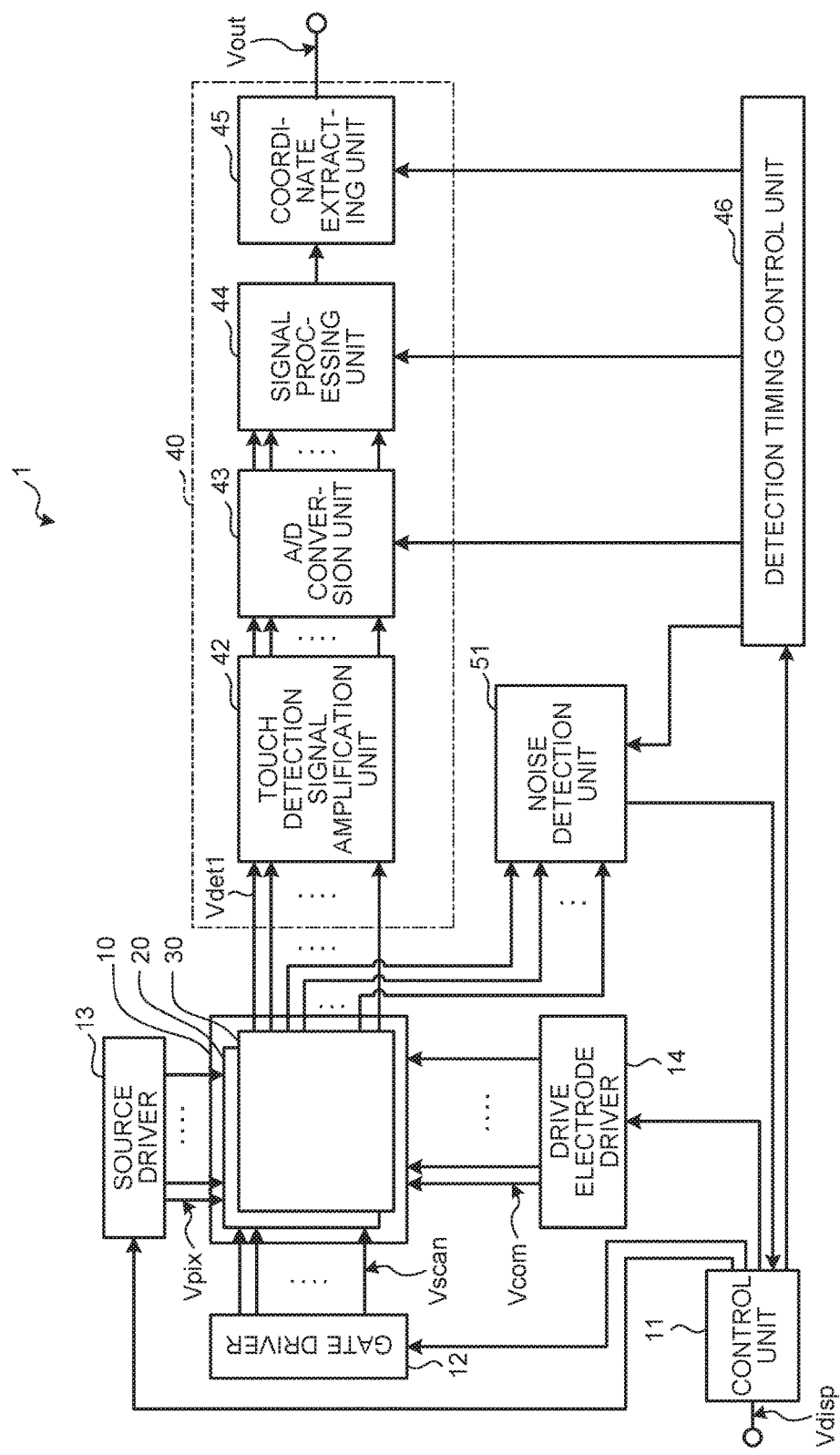
FIG. 1 is a block diagram illustrating a configuration example of a display device with a touch detection function according to a first embodiment.

The following describes embodiments in detail with reference to the drawings. The present invention is not limited to the embodiments described below. Components described below include a component that is easily conceivable by those skilled in the art and substantially the same component. The components described below can be appropriately combined. The disclosure is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same element as that described in the drawing that has already been discussed is denoted by the same reference numeral through the description and the drawings, and detailed description thereof will not be repeated in some cases.

In this disclosure, when an element is described as being "on" another element, the element can be directly on the other element, or there can be one or more elements between the element and the other element.

First Embodiment

FIG. 1 is a block diagram illustrating a configuration example of a display device 1 with a touch detection function according to a first embodiment. As illustrated in FIG. 1, the display device 1 with a touch detection function includes a display unit 10 with a touch detection function, a control unit 11, a gate driver 12, a source driver 13, a drive electrode driver 14, a touch detection unit 40, and a noise detection unit 51. In the display device 1 with a touch detection function, a touch detection function is incorporated in the display unit 10 with a touch detection function. The display unit 10 with a touch detection function is a device integrating a display panel 20 including a liquid crystal display element as a display element with a touch panel 30 serving as a touch detection device for detecting a touch input (touch operation). The display unit 10 with a touch detection function may be what is called an on-cell device in which the touch panel 30 is mounted on the display panel 20. The display panel 20 may be, for example, an organic electroluminescent (EL) display panel. The touch input (touch operation) includes contact on or proximity to the touch panel 30 performed by an external conductor.

As described later, the display panel 20 is sequentially scans each horizontal line in accordance with a scanning signal Vscan supplied from the gate driver 12, thereby performing display. The control unit 11 is a circuit that supplies a control signal to each of the gate driver 12, the source driver 13, the drive electrode driver 14, the touch detection unit 40, and the noise detection unit 51 based on a video signal Vdisp supplied from the outside such that these components operate in synchronization with each other.

The gate driver 12 has a function of sequentially selecting one horizontal line to be a display driving target of the display unit 10 with a touch detection function based on the control signal supplied from the control unit 11.

The source driver 13 is a circuit that supplies a pixel signal Vpix to each sub-pixel SPix (described later) in the display unit 10 with a touch detection function based on the control signal supplied from the control unit 11.

The drive electrode driver 14 is a circuit that supplies a drive signal Vcom to a drive electrode COML (described later) in the display unit 10 with a touch detection function based on the control signal supplied from the control unit 11.

The touch panel 30 operates based on a basic principle of capacitive touch detection, and performs a touch detection operation using a mutual-capacitive system to detect contact or proximity of an external conductor in a display region.

The touch detection unit 40 is a circuit that detects whether there is a touch input on or to the touch panel 30 based on the control signal supplied from the control unit 11 and based on a first touch detection signal Vdet1 supplied from the touch panel 30. The touch detection unit 40 obtains coordinates at which the touch input is performed when there is a touch input. The touch detection unit 40 includes a touch-detection-signal amplification unit 42, an A/D conversion unit 43, a signal processing unit 44, and a coordinate extracting unit 45. A detection timing control unit 46 controls the A/D conversion unit 43, the signal processing unit 44, and the coordinate extracting unit 45 based on the control signal supplied from the control unit 11 such that they operate in synchronization with each other.

Figure 2:
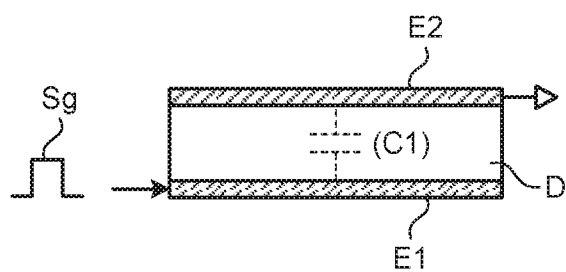
FIG. 2 is an explanatory diagram for explaining a basic principle of mutual-capacitive touch detection and illustrates a state in which a finger is in a non-contact state or a non-proximate state.
Figure 3:
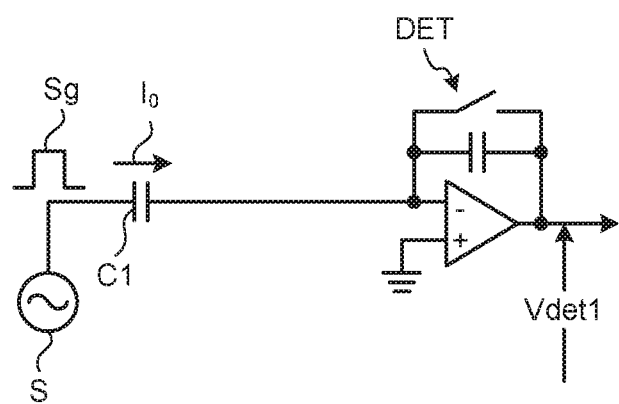
FIG. 3 is an explanatory diagram illustrating an example of an equivalent circuit of the state in which the finger is in the non-contact state or the non-proximate state as illustrated in FIG. 2.
Figure 4:
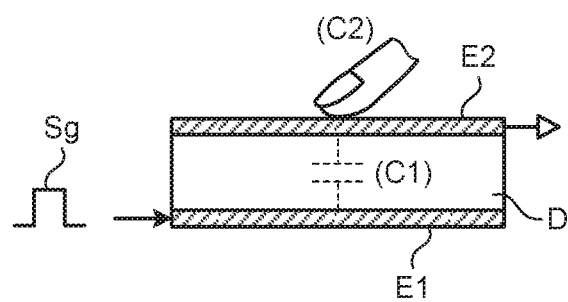
FIG. 4 is an explanatory diagram for explaining the basic principle of mutual-capacitive touch detection and illustrates a state in which the finger is in a contact state or a proximate state.
Figure 5:
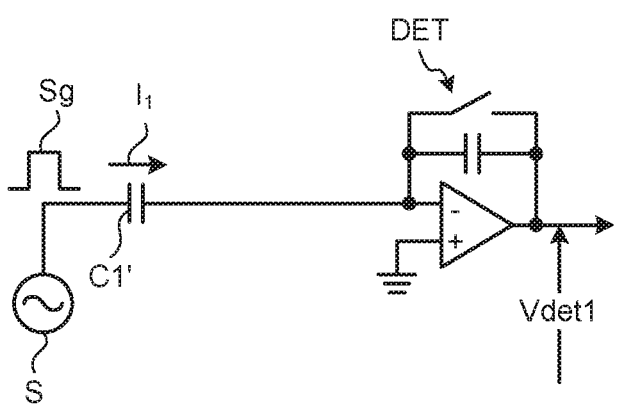
FIG. 5 is an explanatory diagram illustrating an example of an equivalent circuit of the state in which the finger is in the contact state or the proximate state as illustrated in FIG. 4.
Figure 6:
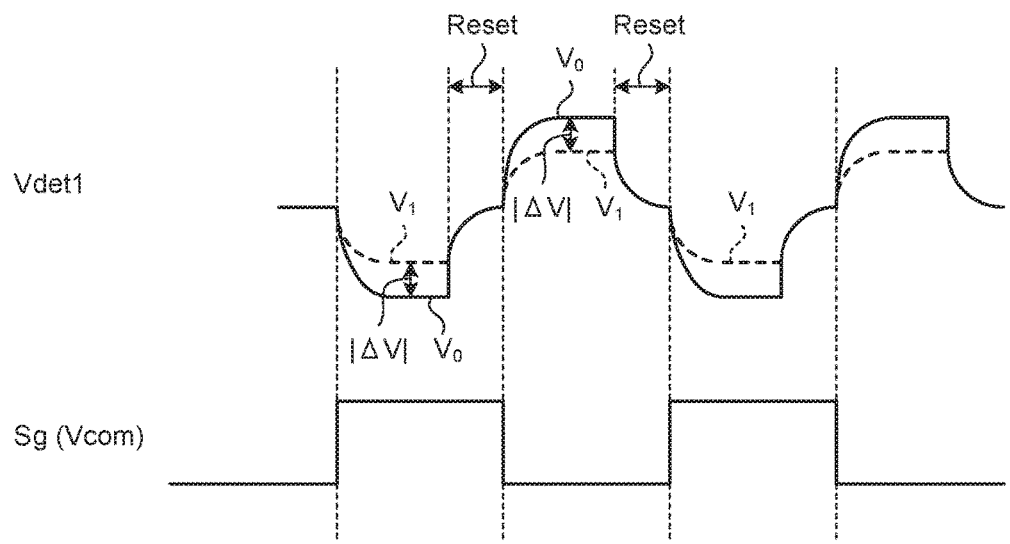
FIG. 6 is a diagram illustrating an example of waveforms of a drive signal and a touch detection signal.

As described above, the touch panel 30 operates based on the basic principle of capacitive touch detection. With reference to FIGS. 2 to 6, the following describes the basic principle of mutual-capacitive touch detection performed by the display device 1 with a touch detection function according to the present embodiment. FIG. 2 is an explanatory diagram for explaining the basic principle of mutual-capacitive touch detection and illustrates a state in which a finger is in a non-contact state or a non-proximate state. FIG. 3 is an explanatory diagram illustrating an example of an equivalent circuit of the state in which the finger is in the non-contact state or the non-proximate state as illustrated in FIG. 2. FIG. 4 is an explanatory diagram for explaining the basic principle of mutual-capacitive touch detection and illustrates a state in which the finger is in a contact state or a proximate state. FIG. 5 is an explanatory diagram illustrating an example of an equivalent circuit of the state in which the finger is in the contact state or the proximate state as illustrated in FIG. 4. FIG. 6 is a diagram illustrating an example of waveforms of the drive signal and the touch detection signal. The following describes a case in which a finger is brought into contact with or proximate to the touch panel. Alternatively, for example, an object including a conductor such as a stylus pen may be used instead of the finger.

For example, as illustrated in FIG. 2, a capacitive element C1 includes a pair of electrodes arranged facing each other with a dielectric D interposed therebetween, that is, a drive electrode E1 and a touch detection electrode E2. As illustrated in FIG. 3, one end of the capacitive element C1 is coupled to an alternate current (AC) signal source (driving signal source) S, and the other end thereof is coupled to a voltage detector (touch detection unit) DET. The voltage detector DET is, for example, an integrating circuit included in the touch-detection-signal amplification unit 42 illustrated in FIG. 1.

When an AC rectangular wave Sg having a predetermined frequency (for example, about several kHz to several hundreds kHz) is applied to the drive electrode E1 (one end of the capacitive element C1) from the AC signal source S, an output waveform (first touch detection signal Vdet1) as illustrated in FIG. 6 appears via the voltage detector DET coupled to the touch detection electrode E2 (the other end of the capacitive element C1). The AC rectangular wave Sg corresponds to the drive signal Vcom input from the drive electrode driver 14.

In a state in which the finger is not in contact with or proximate to the touch panel (non-contact state), as illustrated in FIGS. 2 and 3, a current $I_0$ corresponding to a capacitance value of the capacitive element C1 flows with charge and discharge of the capacitive element C1. The voltage detector DET illustrated in FIG. 3 converts variation in the current $I_0$ corresponding to the AC rectangular wave Sg into variation in voltage (a waveform $V_0$ of a solid line (refer to FIG. 6)).

In a state in which the finger is in contact with or proximate to the touch panel (contact state), as illustrated in FIG. 4, a capacitance C2 formed by the finger is in contact with or proximate to the touch detection electrode E2, so that a capacitance corresponding to a fringe between the drive electrode E1 and the touch detection electrode E2 is shielded. Due to this, the capacitive element C1 functions as a capacitive element C1' having a capacitance value smaller than the capacitance value in the non-contact state. With reference to the equivalent circuit illustrated in FIG. 5, a current $I_1$ flows through the capacitive element C1'. As illustrated in FIG. 6, the voltage detector DET converts variation in the current $I_1$ corresponding to the AC rectangular wave Sg into variation in voltage (a waveform $V_1$ of a dotted line). In this case, amplitude of the waveform $V_1$ is smaller than that of the waveform $V_0$ described above. Accordingly, an absolute value|ΔV| of a voltage difference between the waveform $V_0$ and the waveform $V_1$ varies depending on influence of a conductor such as a finger that is brought into contact with or proximate to the touch panel from the outside. To accurately detect the absolute value|ΔV| of the voltage difference between the waveform $V_0$ and the waveform $V_1$, it is more preferable to provide, to an operation of the voltage detector DET, a period Reset for resetting charge and discharge of a capacitor in accordance with a frequency of the AC rectangular wave Sg through switching in the circuit.

The touch panel 30 illustrated in FIG. 1 sequentially scans each detection block in accordance with the drive signal Vcom supplied from the drive electrode driver 14 to perform mutual-capacitive touch detection.

The touch panel 30 outputs the first touch detection signal Vdet1 of each detection block via the voltage detector DET illustrated in FIG. 3 or FIG. 5 from a plurality of touch detection electrodes TDL described later. The first touch detection signal Vdet1 is supplied to the touch-detection-signal amplification unit 42 of the touch detection unit 40.

The touch-detection-signal amplification unit 42 amplifies the first touch detection signal Vdet1 supplied from the touch panel 30. The touch-detection-signal amplification unit 42 may include an analog low pass filter (LPF) that removes a high frequency component (noise component) included in the first touch detection signal Vdet1 and outputs the remaining.

The A/D conversion unit 43 samples each analog signal that is output from the touch-detection-signal amplification unit 42 at a timing synchronized with the drive signal Vcom, and converts the analog signal into a digital signal.

The signal processing unit 44 includes a digital filter that reduces a frequency component (noise component) other than a frequency at which the drive signal Vcom is sampled included in the output signal of the A/D conversion unit 43. The signal processing unit 44 is a logic circuit that detects whether there is a touch input on or to the touch panel 30 based on the output signal of the A/D conversion unit 43. The signal processing unit 44 performs processing of extracting only a difference of the detection signal caused by the finger. The signal of the difference caused by the finger corresponds to the absolute value $|\Delta V|$ of the difference between the waveform $V_0$ and the waveform $V_1$ described above. The signal processing unit 44 may perform an arithmetic operation for averaging the absolute value $|\Delta V|$ for each detection block to obtain an average value of the absolute value $|\Delta V|$. Due to this, the signal processing unit 44 can suppress influence of the noise. The signal processing unit 44 compares the detected signal of the difference caused by the finger with a predetermined threshold voltage. If the signal of the difference is smaller than the threshold voltage, the signal processing unit 44 determines that an external proximity object is in the non-contact state. If the signal of the difference is equal to or larger than the threshold voltage, the signal processing unit 44 determines that the external proximity object is in the contact state. In this way, the touch detection unit 40 can perform touch detection.

The coordinate extracting unit 45 is a logic circuit that obtains, when a touch is detected by the signal processing unit 44, touch panel coordinates at which the touch is detected. The coordinate extracting unit 45 outputs the touch panel coordinates as a detection signal output Vout.

The noise detection unit 51 illustrated in FIG. 1 detects a noise superimposed on a touch detection electrode TDL (described later) of the touch panel 30. In this case, when a noise due to disturbance propagates to the touch panel 30, a malfunction of touch detection may be caused. For example, the noise due to disturbance has large intensity in the vicinity of a frequency of the drive signal Vcom supplied to the drive electrode COML, variation in a voltage waveform caused by the noise may be erroneously determined to represent that there is a touch input, which may cause a malfunction. The noise detection unit 51 detects the noise, and thereby an operation of touch detection can be appropriately controlled to prevent the malfunction.

The noise detected by the noise detection unit 51 in the present embodiment includes an external noise that enters the display device 1 with a touch detection function from another electric apparatus and the like, a noise caused by an AC power supply when the AC power supply is coupled to the display device 1 with a touch detection function, a noise caused by a display operation performed by the display panel 20, and the like.

Figure 7:
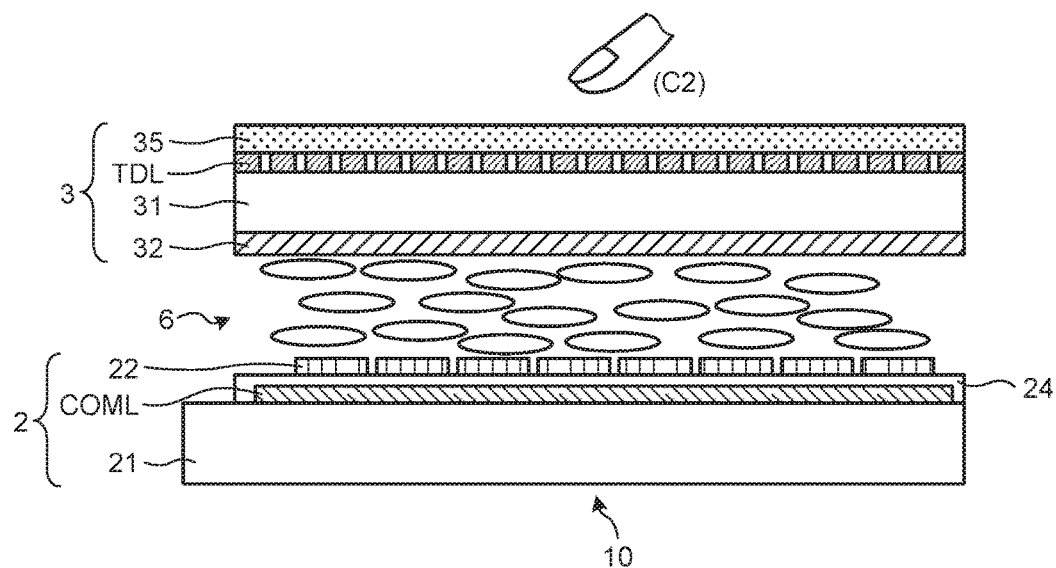
FIG. 7 is a cross-sectional view of a schematic structure of the display device with a touch detection function.

FIG. 7 is a cross-sectional view of a schematic structure of the display device with a touch detection function. As illustrated in FIG. 7, the display unit 10 with a touch detection function includes a pixel substrate 2, a counter substrate 3 arranged being opposed to a surface of the pixel substrate 2 in a direction perpendicular to the surface, and a liquid crystal layer 6 interposed between the pixel substrate 2 and the counter substrate 3.

The pixel substrate 2 includes a TFT substrate 21 serving as a circuit board, a plurality of pixel electrodes 22 arranged in a matrix on the upper side of the TFT substrate 21, the drive electrodes COML arranged between the TFT substrate 21 and the pixel electrode 22, and an insulating layer 24 that insulates the pixel electrode 22 from the drive electrodes COML. A polarizing plate (not illustrated) may be arranged on the lower side of the TFT substrate 21 via a bonding layer.

The counter substrate 3 includes a glass substrate 31 and a color filter 32 formed on one surface of the glass substrate 31. The touch detection electrode TDL serving as a detection electrode of the touch panel 30 is arranged on the other surface of the glass substrate 31. A polarizing plate 35 is arranged on the upper side of the touch detection electrode TDL.

The TFT substrate 21 and the glass substrate 31 are arranged facing each other with a predetermined gap therebetween via a spacer (not illustrated). The liquid crystal layer 6 is arranged in a space between the TFT substrate 21 and the glass substrate 31. The liquid crystal layer 6 modulates light passing therethrough depending on a state of an electric field. For example, the liquid crystal layer 6 includes liquid crystals of lateral electric-field mode such as in-plane switching (IPS) including fringe field switching (FFS). An orientation film may be arranged between the liquid crystal layer 6 and the pixel substrate 2, and between the liquid crystal layer 6 and the counter substrate 3 illustrated in FIG. 7.

Figure 8:
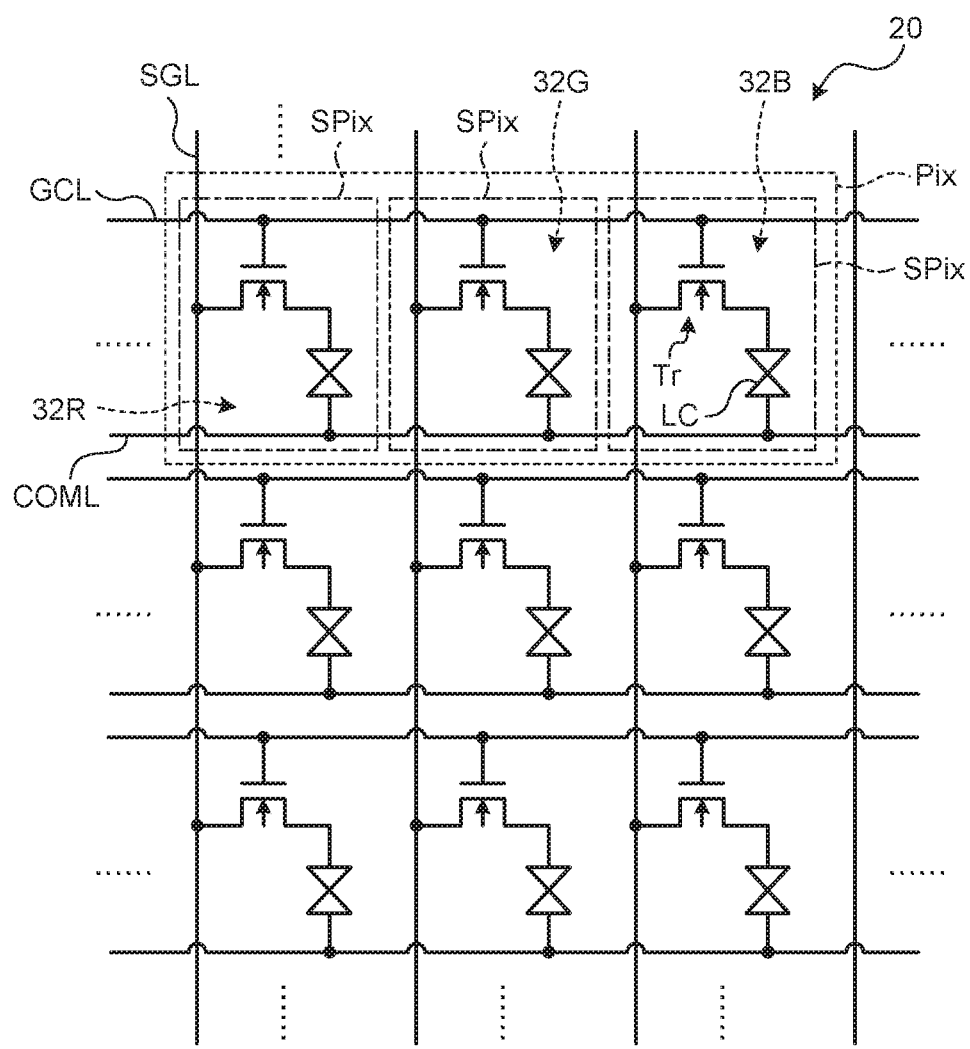
FIG. 8 is a circuit diagram illustrating a pixel array of a display unit with a touch detection function according to the first embodiment.

FIG. 8 is a circuit diagram illustrating a pixel array of the display unit with a touch detection function according to the first embodiment. The TFT substrate 21 illustrated in FIG. 7 is provided with a thin film transistor element (hereinafter, referred to as a TFT element) Tr of each sub-pixel SPix illustrated in FIG. 8, and wiring such as a pixel signal line SGL that supplies the pixel signal Vpix to each pixel electrode 22 and a scanning signal line GCL that drives each TFT element Tr. The pixel signal line SGL and the scanning signal line GCL extend along a plane parallel with the surface of the TFT substrate 21.

The display panel 20 illustrated in FIG. 8 includes a plurality of sub-pixels SPix arranged in a matrix. Each sub-pixel SPix includes the TFT element Tr and a liquid crystal element LC. The TFT element Tr is constituted of a thin film transistor. In this example, the TFT element Tr is constituted of an n-channel metal oxide semiconductor (MOS) TFT. One of a source and a drain of the TFT element Tr is coupled to the pixel signal line SGL, a gate thereof is coupled to the scanning signal line GCL, and the other one of the source and the drain thereof is coupled to one end of the liquid crystal element LC. One end of the liquid crystal element LC is coupled to the other one of the source and the drain of the TFT element Tr, and the other end thereof is coupled to the drive electrode COML.

The sub-pixel SPix is coupled to the other sub-pixels SPix belonging to the same row in the display panel 20 via the scanning signal line GCL. The scanning signal line GCL is coupled to the gate driver 12 (refer to FIG. 1), and receives the scanning signal Vscan supplied from the gate driver 12. The sub-pixel SPix is coupled to the other sub-pixels SPix belonging to the same column in the display panel 20 via the pixel signal line SGL. The pixel signal line SGL is coupled to the source driver 13 (refer to FIG. 1), and receives the pixel signal Vpix supplied from the source driver 13. The sub-pixel SPix is further coupled to the other sub-pixels SPix belonging to the same row via the drive electrode COML. The drive electrode COML is coupled to the drive electrode driver 14 (refer to FIG. 1), and receives the drive signal Vcom supplied from the drive electrode driver 14. That is, in this example, a plurality of sub-pixels SPix belonging to the same row share one drive electrode COML. An extending direction of the drive electrode COML according to the present embodiment is in parallel with an extending direction of the scanning signal line GCL. The extending direction of the drive electrode COML according to the present embodiment is not limited thereto, and may be in parallel with an extending direction of the pixel signal line SGL, for example.

The gate driver 12 illustrated in FIG. 1 drives the scanning signal lines GCL to sequentially scan each of the scanning signal lines GCL. The scanning signal Vscan (refer to FIG. 1) is applied to a gate of the TFT element Tr of the sub-pixel SPix via the scanning signal line GCL, and thereby one horizontal line of the sub-pixels SPix is sequentially selected as the display driving target. In the display device 1 with a touch detection function, the source driver 13 supplies the pixel signal Vpix to the sub-pixels SPix belonging to the one horizontal line to perform display for each horizontal line. In performing this display operation, the drive electrode driver 14 applies the drive signal Vcom to the drive electrode COML corresponding to the one horizontal line.

In the color filter 32 illustrated in FIG. 7, for example, color regions of the color filter colored in three colors of red (R), green (G), and blue (B) may be periodically arranged. Color regions of three colors R, G, and B correspond to the sub-pixels SPix illustrated in FIG. 8, and a pixel Pix is constituted of a set of sub-pixels SPix corresponding to the color regions of three colors. As illustrated in FIG. 7, the color filter 32 faces the liquid crystal layer 6 in a direction perpendicular to the TFT substrate 21. Another combination of colors may be employed for the color filter 32 so long as the colors are different from each other. The combination of colors for the color filter 32 is not limited to three colors. Alternatively, four or more colors may be combined.

Figure 9:
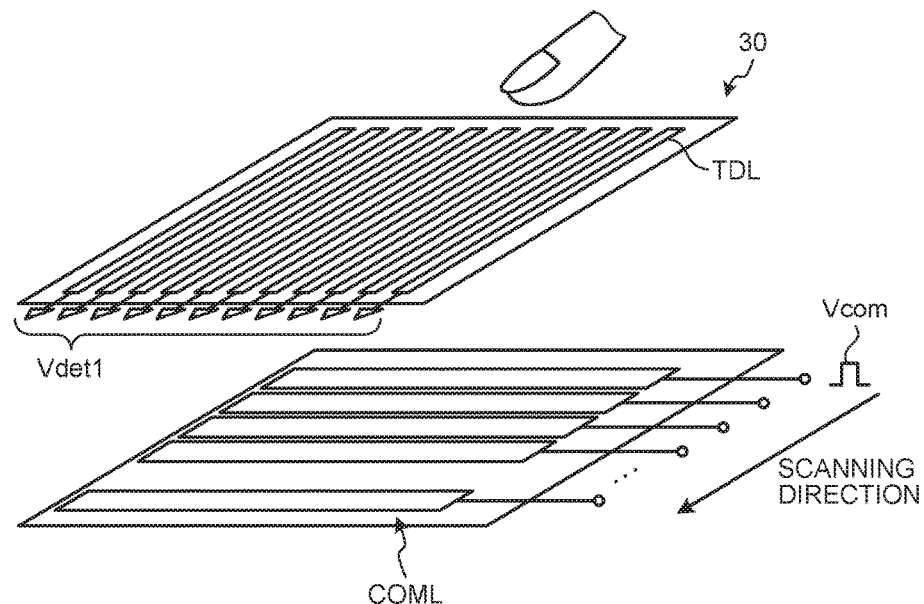
FIG. 9 is a perspective view of a configuration example of a drive electrode and a touch detection electrode of the display unit with a touch detection function according to the first embodiment.

The drive electrode COML illustrated in FIG. 7 and FIG. 8 functions as a common electrode that gives a common potential to the pixel electrodes 22 of the display panel 20, and also functions as a drive electrode used when mutual-capacitive touch detection of the touch panel 30 is performed. FIG. 9 is a perspective view of a configuration example of the drive electrode and the touch detection electrode of the display unit with a touch detection function according to the first embodiment. The touch panel 30 includes the drive electrode COML arranged in the pixel substrate 2 and the touch detection electrode TDL arranged in the counter substrate 3.

The drive electrodes COML are divided into a plurality of striped electrode patterns extending in a horizontal direction of FIG. 9. The touch detection electrodes TDL have a plurality of electrode patterns extending in a direction intersecting with the extending direction of the electrode patterns of the drive electrodes COML. The touch detection electrode TDL faces the drive electrode COML in a direction perpendicular to the surface of the TFT substrate 21 (refer to FIG. 7). Each electrode pattern of the touch detection electrode TDL is coupled to an input terminal of the touch-detection-signal amplification unit 42 in the touch detection unit 40 (refer to FIG. 1). Capacitance is formed at each intersecting portion between each electrode pattern of the drive electrode COML and each electrode pattern of the touch detection electrode TDL.

A translucent conductive material such as Indium tin oxide (ITO) is used for the touch detection electrode TDL and the drive electrode COML, for example. The shape of the touch detection electrode TDL and the drive electrode COML (drive electrode block) is not limited to a plurality of stripes. For example, the touch detection electrode TDL and the drive electrode COML may have a comb-teeth shape. Alternatively, it is sufficient that the touch detection electrodes TDL and the drive electrodes COML have a pattern divided into a plurality of parts, and the shape of slits that separate the drive electrodes COML may be a straight line or a curved line.

With this configuration, when the touch panel 30 performs a mutual-capacitive touch detection operation, the drive electrode driver 14 drives the drive electrodes COML to sequentially scan drive electrode blocks in a time division manner, so that one detection block of the drive electrode COML is sequentially selected. When the first touch detection signal Vdet1 is output from the touch detection electrode TDL, touch detection for one detection block is performed. That is, the drive electrode block corresponds to the drive electrode E1 in the basic principle of mutual-capacitive touch detection described above, the touch detection electrode TDL corresponds to the touch detection electrode E2, and the touch panel 30 detects a touch input in accordance with the basic principle. As illustrated in FIG. 9, in the touch panel 30, the touch detection electrode TDL and the drive electrode COML intersecting with each other constitute a capacitive touch sensor in a matrix. Thus, by scanning across the entire touch detection surface of the touch panel 30, a position where an external conductor is brought into contact with or proximate to the touch panel 30 can be detected.

In the embodiment, one drive electrode block includes one or more drive electrodes COML. The number of drive electrodes COML included in the one drive electrode block can be predetermined. In the embodiment, the detection block corresponds to the drive electrode block.

As an example of an operating method of the display device 1 with a touch detection function, the display device 1 with a touch detection function performs a touch detection operation (touch detection period) and a display operation (display operation period) in a time division manner. The touch detection operation and the display operation may be separately performed in any manner The following describes a method of performing the touch detection operation and the display operation while dividing each operation into a plurality of parts within one frame period (1F) of the display panel 20, that is, within time required for displaying video information corresponding to one screen.

Figure 10:
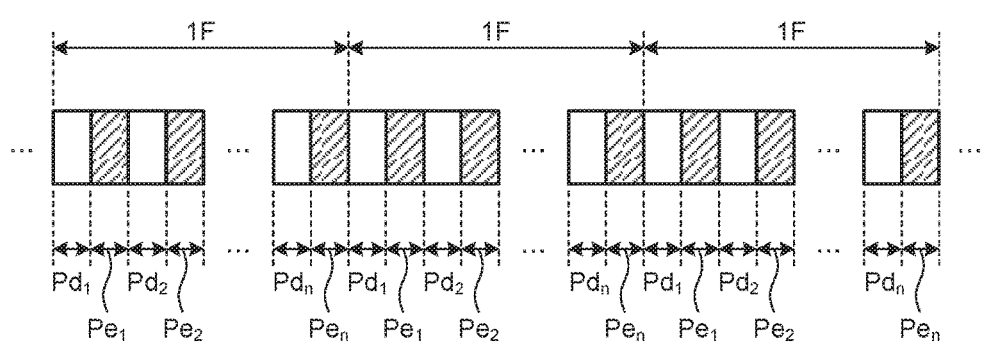
FIG. 10 is a schematic diagram illustrating a relation between a display operation period and a detection operation period in a plurality of frame periods.

FIG. 10 is a schematic diagram illustrating an example of arrangement of the display operation period and the detection operation period in a plurality of frame periods. One frame period (1F) includes a plurality of display operation periods $Pd_x$ (x=1, 2, . . . n) and a plurality of detection operation periods $Pe_x$ (x=1, 2, . . . n) in which at least touch detection is performed. These periods are alternately arranged on a time axis as follows: the display operation period $Pd_1$, the detection operation period $Pe_1$, the display operation period $Pd_2$, the detection operation period $Pe_2$, . . . . The detection operation period $Pe_x$ is arranged in a display stopping period in which the display operation is not performed. The touch detection operation is performed in a plurality of detection operation periods $Pe_x$, so that the touch detection operation and the display operation are performed in a time division manner.

The control unit 11 (refer to FIG. 1) supplies the pixel signals Vpix to pixels Pix of a plurality of rows (refer to FIG. 8) selected in the respective display operation periods $Pd_x$ by controlling the gate driver 12 and the source driver 13.

The touch detection period is arranged in each of the detection operation periods $Pe_x$, and the control unit 11 (refer to FIG. 1) supplies, via the drive electrode driver 14, the drive signal Vcom for touch detection to the drive electrode COML (refer to FIG. 9) selected in the touch detection period. The touch detection unit 40 detects whether there is a touch input and performs an arithmetic operation of coordinates of an input position based on the first touch detection signal Vdet1 supplied from the touch detection electrode TDL.

In the present embodiment, the drive electrode COML also functions as the common electrode of the display panel 20, so that the control unit 11 supplies the drive signal Vcom having a common electrode potential for display to the drive electrode COML selected via the drive electrode driver 14 in the display operation period $Pd_x$.

When the touch detection operation is performed only with the touch detection electrode TDL without the drive electrode COML, for example, when touch detection is performed based on a principle of self-capacitive touch detection (described later), the drive electrode driver 14 may supply the drive signal Vcom for touch detection to the touch detection electrode TDL.

In FIG. 10, a video display operation corresponding to one screen is performed by dividing the video display operation into n parts within one frame period (1F). The display operation period $Pd_x$ within one frame period (1F) may be divided into two periods, or into three or more periods. The touch detection period may also be divided into two periods within one frame period (1F), or into three or more periods.

In each of a plurality of touch detection periods, touch detection may be performed for a corresponding one of n regions obtained by dividing an entire region of one touch detection surface into n parts, or touch detection corresponding to one touch detection surface may be performed. Alternatively, touch detection may be performed with skipping one or more regions in the entire region as needed, for example. The display operation period $Pd_x$ and the detection operation period $Pe_x$ may be performed once within one frame period (1F), without dividing the periods. Although the display operation period $Pd_x$ and the detection operation period $Pe_x$ have the same length in FIG. 10, the display operation period $Pd_x$ may be longer than the detection operation period $Pe_x$ or the display operation period $Pd_x$ may be shorter than the detection operation period $Pe_x$.

Figure 11:
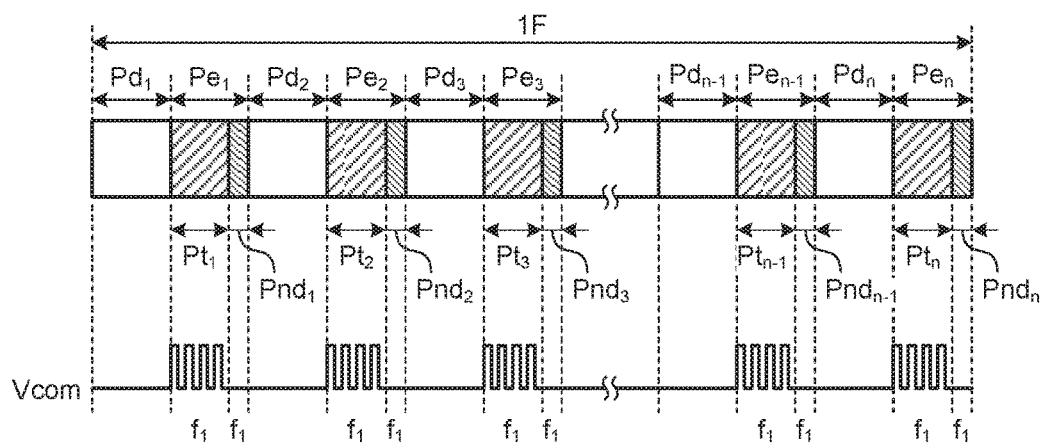
FIG. 11 is a schematic diagram illustrating a relation between the display operation period, a touch detection period, and a noise detection period in one frame period.

Next, the following describes a noise detection operation of the display device 1 with a touch detection function according to the present embodiment. FIG. 11 is a schematic diagram illustrating a relation between the display operation period, the touch detection period, and a noise detection period in one frame period.

As illustrated in FIG. 11, in the display device 1 with a touch detection function, the detection operation period $Pe_x$ (x=1, 2, ... n) includes a touch detection period $Pt_x$ (x=1, 2, ... n) for performing the touch detection operation and a noise detection period $Pnd_x$ (x=1, 2, ... n) for detecting a noise. The noise detection period $Pnd_x$ is shorter than the detection operation period $Pe_x$. One frame period (1F) includes a plurality of noise detection periods $Pnd_x$. The noise detection period $Pnd_x$ is arranged in a period different from the touch detection period $Pt_x$. In the present embodiment, the display operation period $Pd_x$, the touch detection period $Pt_x$, and the noise detection period $Pnd_x$ are repeatedly arranged in this order.

The noise detection period $Pnd_x$ is arranged to be adjacent to the touch detection period $Pt_x$. However, the embodiment is not limited thereto. For example, the detection operation period $Pe_x$ may include only one of the touch detection operation and the noise detection operation. The noise detection period $Pnd_x$ may be a period after the touch detection period $Pt_x$, or a period before the touch detection period $Pt_x$, in the detection operation period $Pe_x$.

In this way, noise detection is performed by dividing the noise detection period $Pnd_x$ into a large number of periods within one frame period (1F), so that the noise can be detected by reducing restrictions due to the touch detection operation and the display operation. Accordingly, optimum touch detection operation and noise detection operation can be performed in accordance with the usage of the display device 1 with a touch detection function.

In the touch detection period $Pt_x$, the drive electrode COML receives the drive signal Vcom having a predetermined frequency (for example, $f_1$) supplied from the drive electrode driver 14 (refer to FIG. 1), and touch detection is performed based on a mutual capacitance between the drive electrode COML and the touch detection electrode TDL. In the noise detection period $Pnd_x$, supply of the drive signal Vcom from the drive electrode driver 14 to the drive electrode COML is stopped. Thus, the noise detection unit 51 can detect a noise superimposed on the touch detection electrode TDL by reducing restrictions due to the drive signal Vcom. In the present embodiment, in at least one of the detection operation periods $Pe_x$, the drive signal Vcom for performing touch detection is not applied to the touch detection electrode TDL.

Figure 12:
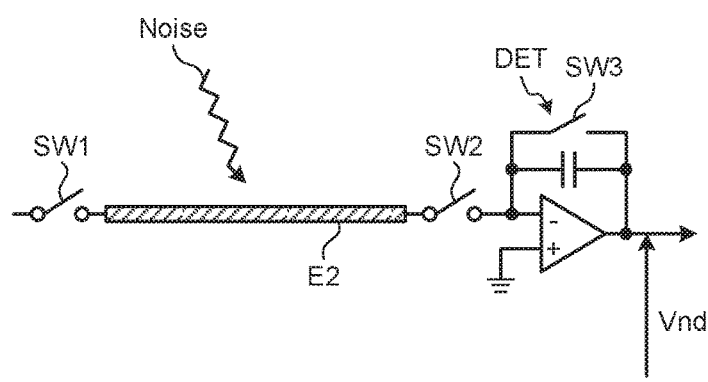
FIG. 12 is an explanatory diagram illustrating an example of an equivalent circuit that detects a noise from the touch detection electrode.

FIG. 12 is an explanatory diagram illustrating an example of an equivalent circuit that detects a noise from the touch detection electrode. As illustrated in FIG. 12, the voltage detector DET is coupled to the touch detection electrode E2 via a switch SW2. The voltage detector DET is the same integrating circuit as that illustrated in FIG. 3 and FIG. 5.

The touch detection electrode E2 is configured to be disconnected from other elements with a switch SW1 and the switch SW2. When a noise due to disturbance is superimposed on the touch detection electrode E2 in a state in which the switch SW1 and the switch SW2 are turned off, an electric charge is accumulated on the capacitance of the touch detection electrode E2. When SW2 is turned on, the accumulated electric charge moves to a capacity in the voltage detector DET, so that an output of the voltage detector DET is increased (Vnd). Accordingly, amplitude of the noise superimposed on the touch detection electrode E2 can be detected.

The switch SW1 is repeatedly turned on and off and the switch SW2 is repeatedly turned on and off in a predetermined period, allowing detection of a noise having a frequency in accordance with the status of the switches SW1 and SW2. In the present embodiment, as illustrated in FIG. 11, when the frequency of the drive signal Vcom is $f_1$, a noise having the frequency $f_1$ can be detected in the noise detection period $Pnd_x$. As described above, in the touch detection operation in the touch detection period $Pt_x$ the first touch detection signal Vdet1 is sampled at a timing synchronized with the frequency of the drive signal Vcom. The noise detection period $Pnd_x$ is arranged in a period different from the touch detection period $Pt_x$ so that the drive signal Vcom is not supplied to the drive electrode COML in the noise detection period $Pnd_x$. Thus, the noise detection unit 51 can detect a noise having a frequency matching with the frequency of the first touch detection signal Vdet1 or a frequency close thereto with high accuracy.

In detecting the noise, a voltage signal may be supplied via the switch SW1 so that the touch detection electrode E2 has a fixed electric potential. In a state in which the switch SW1 is turned on and the switch SW2 is turned off, a noise due to disturbance is superimposed on the fixed electric potential of the touch detection electrode E2. After that, when the switch SW1 is turned off and the switch SW2 is turned on, the electric charge accumulated in the touch detection electrode E2 moves to the capacity in the voltage detector DET, and the noise is detected. By fixing the electric potential of the touch detection electrode E2, amplitude of the noise can be detected with high accuracy.

Figure 13:
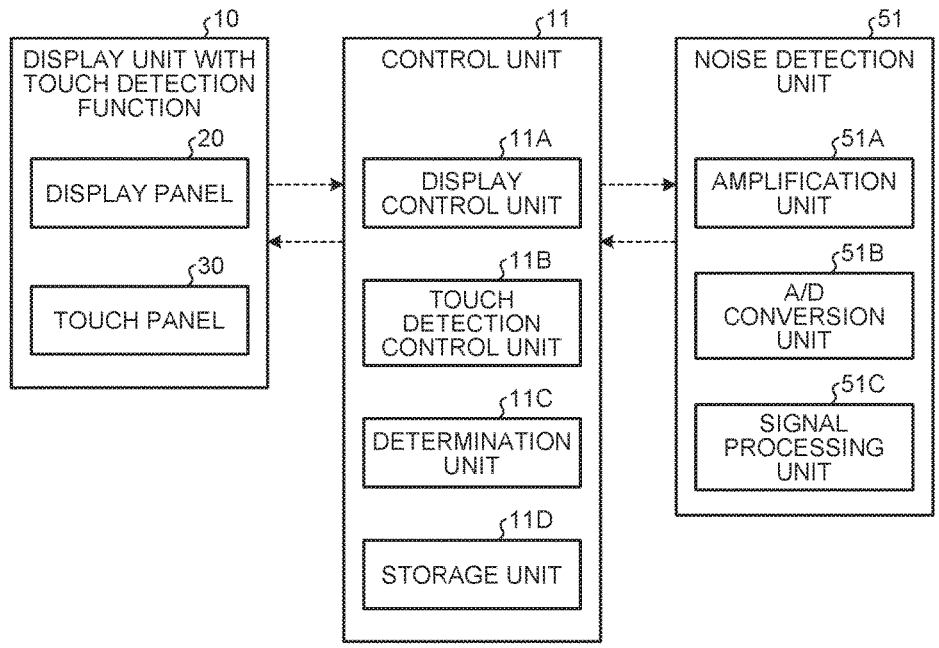
FIG. 13 is a block diagram illustrating a configuration example of the display unit with a touch detection function, a control unit, and a noise detection unit.
Figure 14:
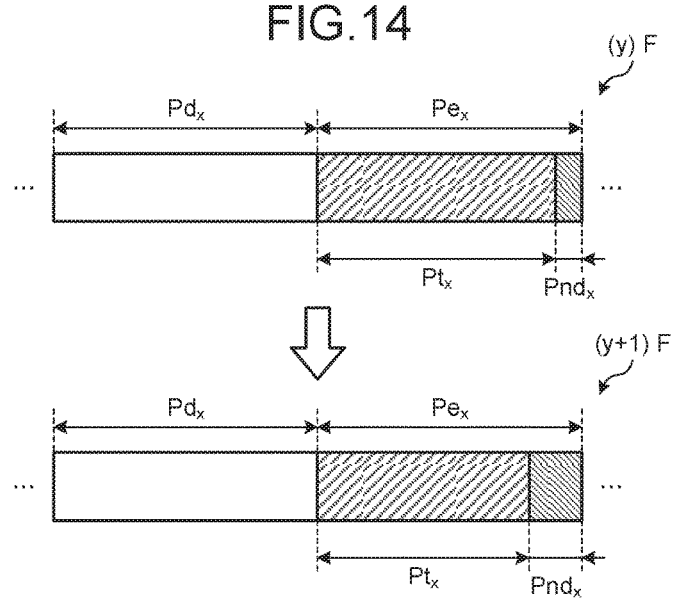
FIG. 14 is a schematic diagram for explaining a relation between the display operation period, the touch detection period, and the noise detection period in a case of detecting the noise according to the first embodiment.

The following describes an operation of the display device 1 with a touch detection function according to the present embodiment in a case of detecting a noise with reference to FIG. 13 to FIG. 15. FIG. 13 is a block diagram illustrating a configuration example of the display unit with a touch detection function, the control unit, and the noise detection unit. FIG. 14 is a schematic diagram for explaining a relation between the display operation period, the touch detection period, and the noise detection period in a case of detecting a noise. FIG. 15 is a flowchart for explaining the touch detection operation and the noise detection operation.

As illustrated in FIG. 13, the noise detection unit 51 includes an amplification unit 51A that amplifies a noise signal detected from the touch detection electrode TDL, an A/D conversion unit 51B that converts the noise signal supplied from the amplification unit 51A into a digital signal, and a signal processing unit 51C that detects the amplitude of the noise signal based on an output signal of the A/D conversion unit 51B. The amplification unit 51A includes the voltage detector DET illustrated in FIG. 12, and amplifies a noise signal Vnd detected as the voltage signal. The signal processing unit 51C may include a digital filter that reduces frequency components other than a predetermined frequency included in the noise signal Vnd.

The control unit 11 includes a display control unit 11A, a touch detection control unit 11B, a determination unit 11C, and a storage unit 11D. The display control unit 11A supplies control signals to the gate driver 12, the source driver 13, and the drive electrode driver 14 illustrated in FIG. 1 to control the display operation of the display panel 20. The touch detection control unit 11B supplies control signals to the drive electrode driver 14 and the touch detection unit 40 to control the touch detection operation of the touch panel 30. The touch detection control unit 11B can control the noise detection operation of the noise detection unit 51, and performs the touch detection operation and the noise detection operation in a time division manner. The determination unit 11C determines whether there is a noise based on information of the noise signal Vnd received from the noise detection unit 51. The storage unit 11D stores a threshold of the noise signal Vnd that is used by the determination unit 11C in determining the presence or absence of a noise, and an operation program of the display control unit 11A and the touch detection control unit 11B that is executed when a noise is detected.

The display control unit 11A may be mounted on a display control integrated circuit (IC), and the touch detection control unit 11B may be mounted on a touch detection IC. In this case, the touch detection unit 40 illustrated in FIG. 1 may also be mounted on the touch detection IC. The storage unit 11D may be a random access memory (RAM), a read only memory (ROM), and the like.

The upper diagram in FIG. 14 represents one display operation period $Pd_x$ and one detection operation period $Pe_x$ in the y-th one frame period ((y)F), for example. The lower diagram in FIG. 14 represents one display operation period $Pd_x$ and one detection operation period $Pe_x$ in the subsequent (y+1)-th one frame period ((y+1)F) after a noise is detected. The display control unit 11A performs the display operation and a display stopping operation within one frame period (1F) in a time division manner As illustrated in the upper diagram in FIG. 14, the display operation period $Pd_x$ and the detection operation period $Pe_x$ are alternately arranged. The touch detection control unit 11B performs the touch detection operation and the noise detection operation within the detection operation period $Pe_x$ in a time division manner. In a state in which a noise is not detected (initial state), proportions of the touch detection period $Pt_x$ and the noise detection period $Pnd_x$ in the detection operation period $Pe_x$ are 90% and 10%, respectively (Step ST11 in FIG. 15).

Next, the noise detection unit 51 detects a noise in each noise detection period $Pnd_x$ within one frame period ((y)F). The determination unit 11C determines whether the amplitude of the noise signal Vnd received from the noise detection unit 51 is equal to or larger than the threshold. The determination unit 11C may perform the determination based on a history of the noise signal Vnd detected in the noise detection period $Pnd_x$ within one frame period ((y)F) or a plurality of frame periods. Alternatively, the determination unit 11C may perform the determination per a predetermined number of noise detection periods $Pnd_x$.

If the amplitude of the noise signal Vnd is smaller than the threshold, the determination unit 11C determines that noise is not detected (No at Step ST12 in FIG. 15). The touch detection control unit 11B performs the touch detection operation and the noise detection operation in the next one frame period ((y+1)F) without changing the proportions of the touch detection period $Pt_x$ and the noise detection period $Pnd_x$, that is, the proportions of the touch detection period $Pt_x$ and the noise detection period $Pnd_x$ are 90% and 10%, respectively (Step ST14 in FIG. 15). If the amplitude of the noise signal Vnd is equal to or larger than the threshold, the determination unit 11C determines that a noise is detected (Yes at Step ST12 in FIG. 15). As illustrated in the lower diagram in FIG. 14, the touch detection control unit 11B lengthens the noise detection period $Pnd_x$ in the detection operation period $Pe_x$ in the next one frame period ((y+1)F) to enhance noise detection. Specifically, the proportions of the touch detection period $Pt_x$ and the noise detection period $Pnd_x$ are changed to be 80% and 20%, respectively (Step ST13 in FIG. 15). Then the touch detection control unit 11B performs the touch detection operation and the noise detection operation in the next one frame period ((y+1)F) in a state in which noise detection is enhanced (Step ST14 in FIG. 15).

In the display device 1 with a touch detection function according to the present embodiment, a plurality of noise detection periods $Pnd_x$ are arranged in one frame period (1F), and the touch detection period $Pt_x$ and the noise detection period $Pnd_x$ are arranged in different periods in the detection operation period $Pe_x$, so that a degree of freedom of the noise detection operation can be improved. That is, noise detection can be enhanced by lengthening the noise detection period $Pnd_x$ in accordance with magnitude of an external noise detected by the noise detection unit 51.

A timing for enhancing noise detection is assumed to be one frame period ((y+1)F) subsequent to the y-th frame period in which the noise detection unit 51 has detected the noise. However, the embodiment is not limited thereto. The noise detection period $Pnd_x$ may be lengthened from the middle of the y-th one frame period ((y)F) in which the noise has been detected. In the display device 1 with a touch detection function according to the present embodiment, noise detection is enhanced by lengthening the noise detection period $Pnd_x$. Alternatively, when the display device 1 with a touch detection function is used in an electrically low-noise environment and the noise detection unit 51 rarely detects a noise, an operation in which touch detection is enhanced may be performed by shortening the noise detection period $Pnd_x$ so that the touch detection period $Pt_x$ is 95% and the noise detection period $Pnd_x$ is 5%, for example.

Modification

FIG. 16 is a schematic diagram illustrating a relation between the display operation period, the touch detection period, and the noise detection period in one frame period according to a modification of the first embodiment. In FIG. 11, all the detection operation periods $Pe_x$ in one frame period (1F) each include the touch detection period $Pt_x$ and the noise detection period $Pnd_x$. However, the embodiment is not limited thereto. As illustrated in FIG. 16, for example, the proportion of the touch detection period $Pt_x$ may be set to be 100% in the detection operation period $Pe_1$ and the detection operation period $Pe_2$ so that noise detection is not performed. The detection operation periods $Pe_3$, $Pe_4$, ... $Pe_n$ include the noise detection periods $Pnd_x$ (x=1, 2, ... n−2), respectively. Even in such an aspect, as described above, noise detection can be enhanced or a noise detection time can be shortened by changing the length of the noise detection period $Pnd_x$.

In this way, each of the detection operation periods $Pe_x$ included in one frame period includes at least the touch detection period $Pt_x$. Additionally, the touch detection period $Pt_x$ and the noise detection period $Pnd_x$ are included in at least one of the detection operation periods $Pe_x$ in one frame period. The detection operation period $Pe_x$ for performing only touch detection is not limited to the detection operation period $Pe_1$ and the detection operation period $Pe_2$. The detection operation period $Pe_x$ for performing only touch detection may be any one of the detection operation periods $Pe_x$ or three or more of the detection operation periods $Pe_x$ in one frame period (1F). It is sufficient that at least one detection operation period $Pe_x$ included in one frame period (1F) includes the touch detection period $Pt_x$, and the noise detection period $Pnd_x$. More preferably, two or more detection operation periods $Pe_x$ included in one frame period (1F) each include the touch detection period $Pt_x$ and the noise detection period $Pnd_x$. All of the detection operation periods $Pe_x$ included in one frame period (1F) may have the same length.

Second Embodiment

Figure 17:
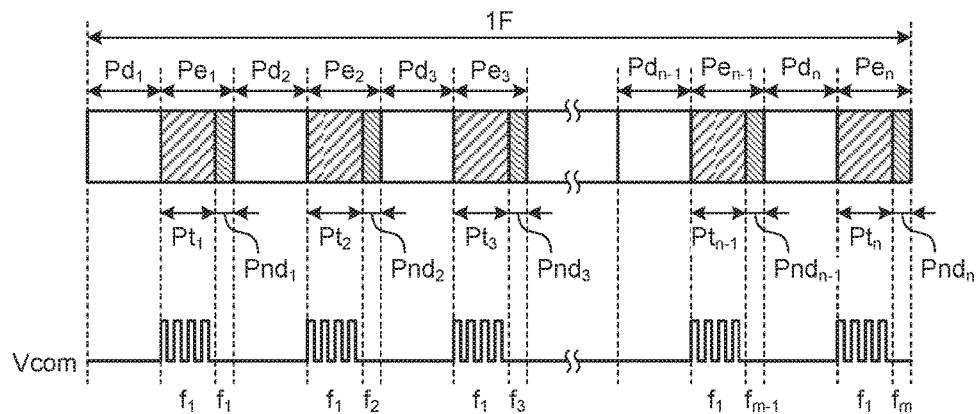
FIG. 17 is a schematic diagram illustrating a relation between the display operation period, the touch detection period, and the noise detection period in one frame period in the display device with a touch detection function according to a second embodiment.

FIG. 17 is a schematic diagram illustrating a relation between the display operation period, the touch detection period, and the noise detection period in one frame period in a display device with a touch detection function according to a second embodiment. Regarding the display device with a touch detection function according to the present embodiment, an arrangement order of the display operation period $Pd_x$, the detection operation period $Pe_x$, the touch detection period $Pt_x$, and the noise detection period $Pnd_x$ is the same as that in the first embodiment, and the noise detection period $Pnd_x$ is shorter than the detection operation period $Pe_x$. The present embodiment is different from the first embodiment in that noise having different frequencies is detected in the respective noise detection periods $Pnd_x$ in one frame period (1F).

For example, the noise detection unit 51 detects a noise having the frequency $f_1$ in the noise detection period $Pnd_1$, and detects a noise having a frequency $f_2$ in the next noise detection period $Pnd_2$. In this way, noises having the frequency $f_1$, $f_2$, ... $f_m$ are detected in the noise detection periods $Pnd_x$, respectively. The noise detection unit 51 may change the switching timing of the switch SW1 and the switch SW2 illustrated in FIG. 12 for each noise detection period $Pnd_x$ so as to detect noises having different frequencies. Each of the frequencies $f_1$, $f_2$, ... $f_m$ is a frequency to be a candidate for the frequency of the drive signal Vcom, and the information about the frequencies $f_1$, $f_2$, ... $f_m$ is stored in advance in the storage unit 11D illustrated in FIG. 13. In FIG. 17, noises having different frequencies are detected in the respective noise detection periods $Pnd_x$ in one frame period (1F). However, the embodiment is not limited thereto. A noise having a different frequency may be detected per a plurality of noise detection periods $Pnd_x$. For example, the noise having the frequency $f_1$ may be detected in the noise detection period $Pnd_1$ and the noise detection period $Pnd_2$, and the noise having the frequency $f_2$ may be detected in a subsequent noise detection period $Pnd_3$ and a noise detection period $Pnd_4$ (not illustrated).

Figure 18:
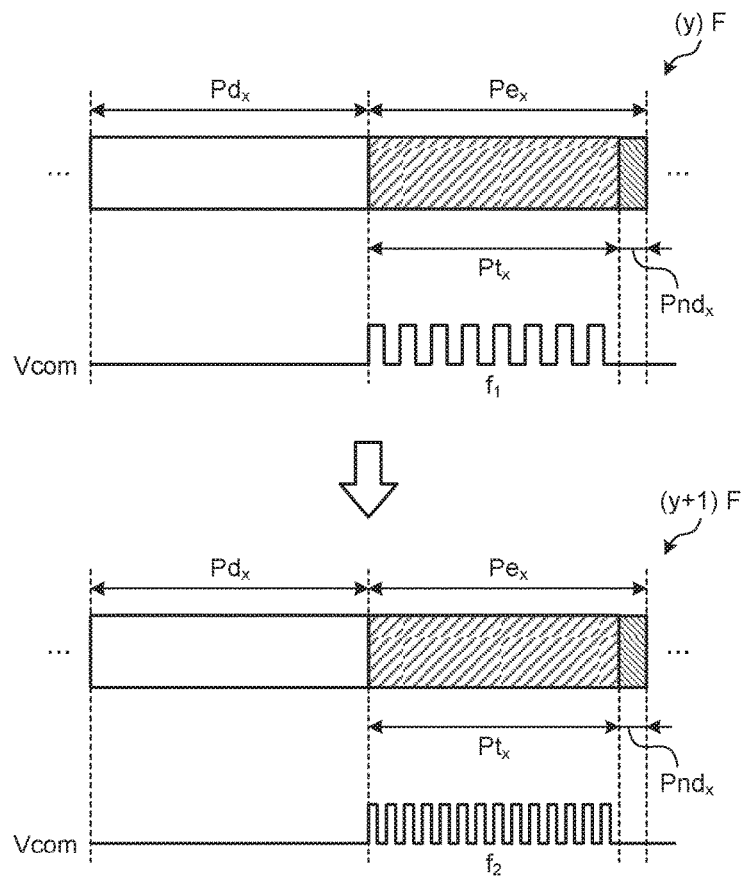
FIG. 18 is a schematic diagram for explaining a relation between the display operation period, the touch detection period, and the noise detection period in a case of detecting a noise according to the second embodiment.
Figure 19:
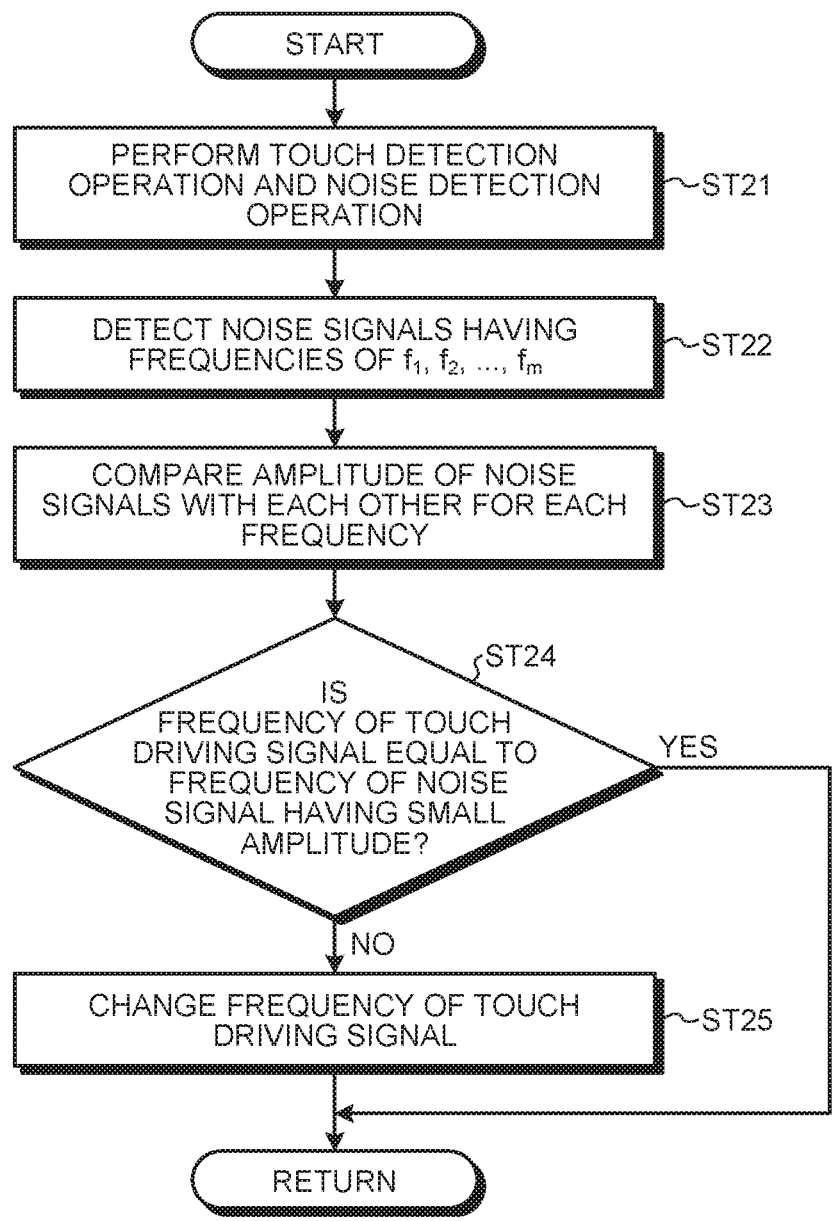
FIG. 19 is a flowchart for explaining the touch detection operation and the noise detection operation according to the second embodiment.

Next, the following describes an operation of the display device with a touch detection function in a case of detecting a noise according to the present embodiment with reference to FIG. 13, FIG. 18, and FIG. 19. FIG. 18 is a schematic diagram for explaining a relation between the display operation period, the touch detection period, and the noise detection period in a case of detecting a noise according to the second embodiment. FIG. 19 is a flowchart for explaining the touch detection operation and the noise detection operation according to the second embodiment.

The display control unit 11A performs the display operation and the display stopping operation in a time division manner in one frame period (1F). As illustrated in the upper diagram in FIG. 18, the display operation period $Pd_x$ and the detection operation period $Pe_x$ are alternately arranged. The touch detection control unit 11B performs the touch detection operation and the noise detection operation in a time division manner in the detection operation period $Pe_x$ (Step ST21 in FIG. 19). In a state in which a noise is not detected (initial state), the proportions of the touch detection period $Pt_x$ and the noise detection period $Pnd_x$ in the detection operation period $Pe_x$ are 90% and 10%, respectively. The drive signal Vcom having the frequency $f_1$ is supplied to the drive electrode COML in the touch detection period $Pt_x$.

The noise detection unit 51 detects noise signals Vnd having different frequencies (frequency $f_1$, $f_2$, ... $f_m$) in the y-th one frame period ((y)F) (Step ST22 in FIG. 19). The noise detection unit 51 outputs information on the detected noise signal Vnd to the control unit 11 for each frequency. The information on the noise indicates the amplitude of the noise calculated by the signal processing unit 51C. The determination unit 11C compares the amplitudes of the noise signals Vnd with each other for each of the different frequencies $f_1$, $f_2$, ... $f_m$ (Step ST23 in FIG. 19). The storage unit 11D may store, for each of the different frequencies $f_1$, $f_2$, ... $f_m$, the information on the noise signal Vnd corresponding to a plurality of frames. The determination unit 11C may perform comparison using each piece of information on the noise corresponding to a plurality of frames. Thus, the noise signals Vnd can be compared with each other with high accuracy, and a frequency having a small noise and a frequency having a large noise can be obtained.

The determination unit 11C determines whether the frequency $f_1$ of the drive signal Vcom is substantially equal to the frequency of the noise signal Vnd the amplitude of which is the smallest. If the frequencies are substantially equal to each other, the touch detection operation and the noise detection operation in the next one frame period ((y+1)F) are performed without changing the frequency of the drive signal Vcom (Yes at Step ST24 in FIG. 19). If the frequency $f_1$ of the drive signal Vcom is not substantially equal to the frequency of the noise signal the amplitude of which is the smallest (No at Step ST24 in FIG. 19), the touch detection control unit 11B changes the frequency of the drive signal Vcom from the frequency $f_1$ to the frequency having small amplitude of the noise signal Vnd (for example, the frequency $f_2$) (Step ST25 in FIG. 19). Then, as illustrated in the lower diagram in FIG. 18, the touch detection operation is performed with the frequency $f_2$ of the drive signal Vcom for the next (y+1)-th one frame period ((y+1)F). The control unit 11 repeats the above-described process, and the touch detection control unit 11B changes the frequency of the drive signal Vcom to the frequency of the noise signal Vnd having the smallest amplitude when the frequency of the drive signal Vcom is different from the frequency of the noise signal Vnd having the smallest amplitude.

Thus, in the display device with a touch detection function according to the present embodiment, one frame period (1F) includes a plurality of noise detection periods $Pnd_x$, and a plurality of noise detection periods $Pnd_x$ are each arranged in a period different from the touch detection period $Pt_x$. Due to this, the noise signal Vnd can be easily detected for each frequency. By comparing the noise signals Vnd detected for individual frequencies with each other and changing the frequency of the drive signal Vcom to the frequency having small amplitude of the noise signal Vnd, resistance to noise can be improved, and erroneous detection or malfunction in touch detection can be prevented.

In the above description, the frequency $f_1$ of the drive signal Vcom is compared with the frequency of the noise signal Vnd having the smallest amplitude. Alternatively, the frequency $f_1$ of the drive signal Vcom may be compared with the frequency of the noise signal having the largest amplitude. When the frequencies are substantially equal to each other, the resistance to noise can be improved by changing the frequency of the drive signal Vcom to the frequency of the noise signal Vnd having the amplitude equal to or smaller than a predetermined threshold. In FIG. 18, the proportions of the touch detection period $Pt_x$ and the noise detection period $Pnd_x$ are not changed. However, in an electrically noisy environment, the noise detection period $Pnd_x$ may be lengthened to enhance noise detection in the same manner as the first embodiment.

Third Embodiment

Figure 20:
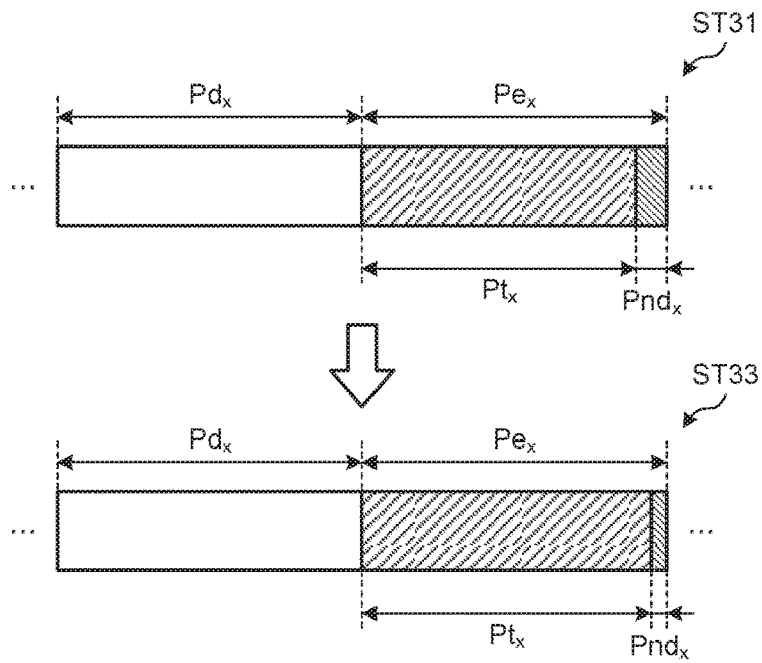
FIG. 20 is a schematic diagram for explaining a relation between the display operation period, the touch detection period, and the noise detection period in a case of detecting a noise according to a third embodiment.
Figure 21:
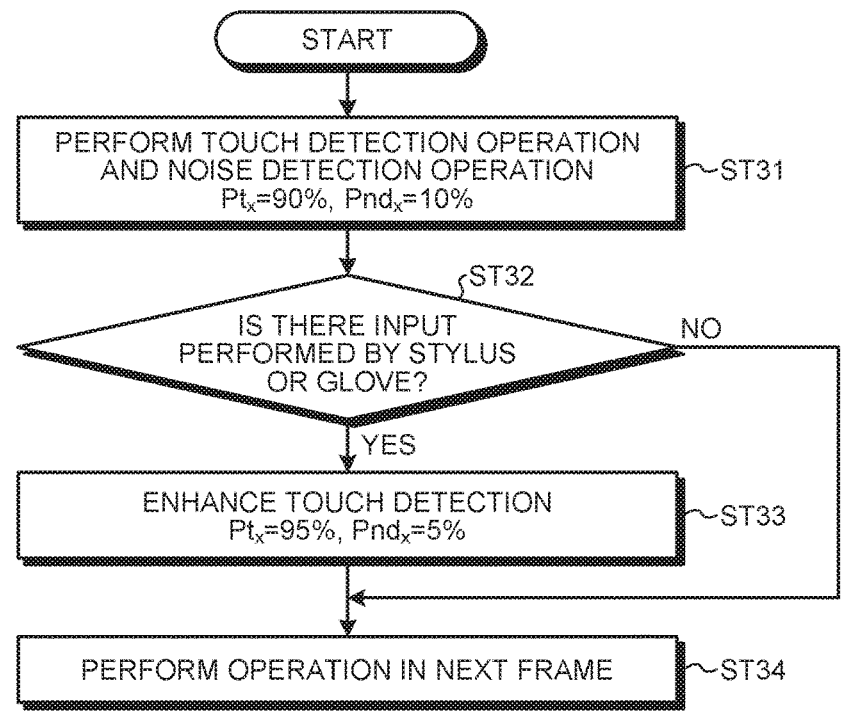
FIG. 21 is a flowchart for explaining the touch detection operation and the noise detection operation according to the third embodiment.

FIG. 20 is a schematic diagram for explaining a relation between the display operation period, the touch detection period, and the noise detection period in a case of detecting a noise according to a third embodiment. FIG. 21 is a flowchart for explaining the touch detection operation and the noise detection operation according to the third embodiment. In the display device with a touch detection function according to the first embodiment and the second embodiment described above, a relation between the touch detection period and the noise detection period is changed by detecting the noise. However, the embodiment is not limited thereto. The display device with a touch detection function according to the third embodiment can optimize the touch detection period and the noise detection period depending on whether the touch input is performed by a finger or performed by using a stylus pen, a glove, and the like.

As illustrated in the upper diagram in FIG. 20, in a case of performing an operation of detecting contact or proximity of a finger, the proportions of the touch detection period $Pt_x$ and the noise detection period $Pnd_x$ in the detection operation period $Pe_x$ are, for example, 90% and 10%, respectively (Step ST31 in FIG. 21). Next, when detecting a touch input, the touch detection unit 40 supplies information about distribution of detected first touch detection signals Vdet1 to the control unit 11. The determination unit 11C determines whether there is a touch input performed by a stylus pen or a glove based on the information about distribution of the first touch detection signals Vdet1 (Step ST32 in FIG. 21).

Figure 22:
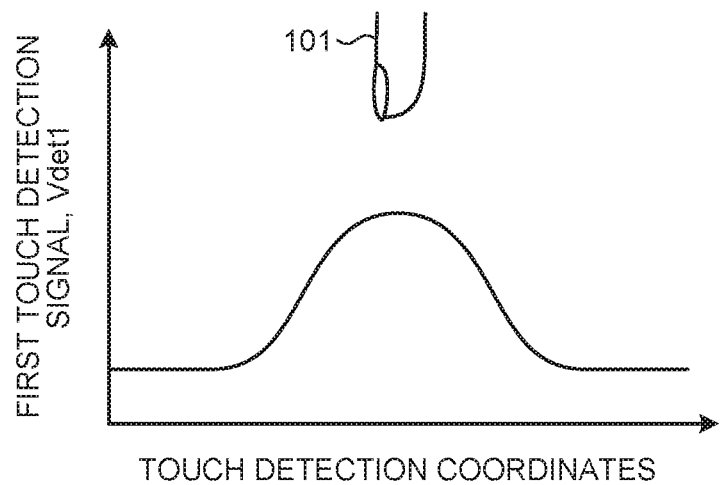
FIG. 22 is a graph schematically illustrating an example of a relation between a first touch detection signal and touch detection coordinates in a state in which a finger is in a contact state or a proximate state.
Figure 23:
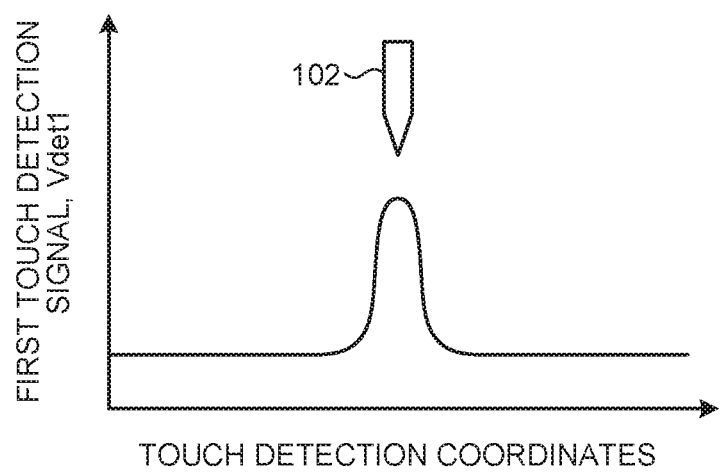
FIG. 23 is a graph schematically illustrating an example of a relation between the first touch detection signal and the touch detection coordinates in a state in which a stylus pen is in a contact state or a proximate state.
Figure 24:
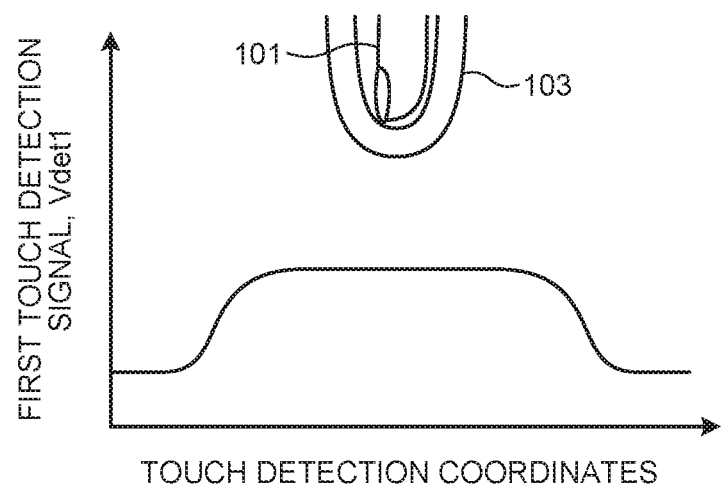
FIG. 24 is a graph schematically illustrating an example of a relation between the first touch detection signal and the touch detection coordinates in a state in which a glove is in a contact state or a proximate state.

FIG. 22 is a graph schematically illustrating an example of a relation between the first touch detection signal and touch detection coordinates in a state in which a finger is in a contact state or a proximate state. FIG. 23 is a graph schematically illustrating an example of a relation between the first touch detection signal and the touch detection coordinates in a state in which a stylus pen is in a contact state or a proximate state. FIG. 24 is a graph schematically illustrating an example of a relation between the first touch detection signal and the touch detection coordinates in a state in which a glove is in a contact state or a proximate state. The touch detection coordinates in FIG. 22 to FIG. 24 represent coordinates in a direction in which a plurality of drive electrodes COML illustrated in FIG. 9 are arranged.

In the present embodiment, a stylus pen 102 means a pen-type pointing device in which a conductor serving as a pointing member is mounted at a distal end thereof. The pointing member of the stylus pen 102 is thinner than a finger and the like, so that sensitivity in touch detection may be lowered. A glove 103 is a personal ornament that covers a hand to protect the hand from cold and/or injury, to dress the hand, etc. For example, a conductor is arranged at a fingertip portion, and a touch input can be performed in a state in which the glove 103 is put on a hand.

As illustrated in FIG. 23, when the stylus pen 102 is in a contact state or a proximate state, a peak of the first touch detection signal Vdet1 is sharpened as compared with a case in which a finger 101 is in a contact state or a proximate state illustrated in FIG. 22. As illustrated in FIG. 24, when the touch input is performed by the finger 101 on which the glove 103 and the like are put, and the glove 103 is in a contact state or a proximate state, an area facing the touch detection surface becomes larger than that in a case in which the finger 101 is in a contact state or a proximate state, and the peak of the first touch detection signal Vdet1 is broadened. In this way, when the touch input is performed by the stylus pen 102, the glove 103, or the like, an output of the first touch detection signal Vdet1 is changed, and the relation between the first touch detection signal Vdet1 and the touch detection coordinates is changed, so that erroneous detection may be caused.

The storage unit 11D stores a curve representing the relation between the first touch detection signals Vdet1 and the touch detection coordinates as reference information. The determination unit 11C can determine whether there is a touch input performed by the stylus pen 102 or the glove 103 by comparing the information about distribution of the first touch detection signals Vdet1 supplied from the touch detection unit 40 with the reference information of the storage unit 11D. The determination unit 11C may perform the determination by comparing half-value widths of the first touch detection signals Vdet1 with each other.

If there is no touch input performed by the stylus pen 102 or the glove 103 (No at Step ST32 in FIG. 21), the determination unit 11C determines that the touch input is performed by the finger, and performs the touch detection operation and the noise detection operation in the next one frame period without changing the touch detection period $Pt_x$ and the noise detection period $Pnd_x$ (Step ST34 in FIG. 21). If the determination unit 11C determines that there is a touch input performed by the stylus pen 102 or the glove 103 (Yes at Step ST32 in FIG. 21), as illustrated in the lower diagram in FIG. 20, the touch detection control unit 11B changes the proportions of the touch detection period $Pt_x$ and the noise detection period $Pnd_x$ to 95% and 5%, respectively, and enhances touch detection (Step ST33 in FIG. 21). Then, the touch detection operation and the noise detection operation in the next one frame period (1F) are performed (Step ST34 in FIG. 21).

As described above, according to the present embodiment, one frame period (1F) includes a plurality of noise detection periods $Pnd_x$, and the touch detection period $Pt_x$ and the noise detection period $Pnd_x$ are arranged in different periods in the detection operation period $Pe_x$, so that a degree of freedom of the touch detection operation and the noise detection operation can be improved. That is, by enhancing touch detection to perform the touch detection operation when distribution of the first touch detection signals Vdet1 is changed, for example, detection accuracy can be improved. The proportion of the touch detection period $Pt_x$ is increased in the detection operation period $Pe_x$, so that touch detection can be enhanced without changing the display operation.

The method of changing the touch detection period $Pt_x$ and the noise detection period $Pnd_x$ based on the information about distribution of the first touch detection signals Vdet1 described in the present embodiment may be combined with the first embodiment and the second embodiment described above. For example, when the noise detection unit 51 detects a noise equal to or larger than a threshold, the proportion of the noise detection period $Pnd_x$ illustrated in the lower diagram in FIG. 20 may be changed from 5% to 10% to enhance noise detection.

Fourth Embodiment

Figure 25:
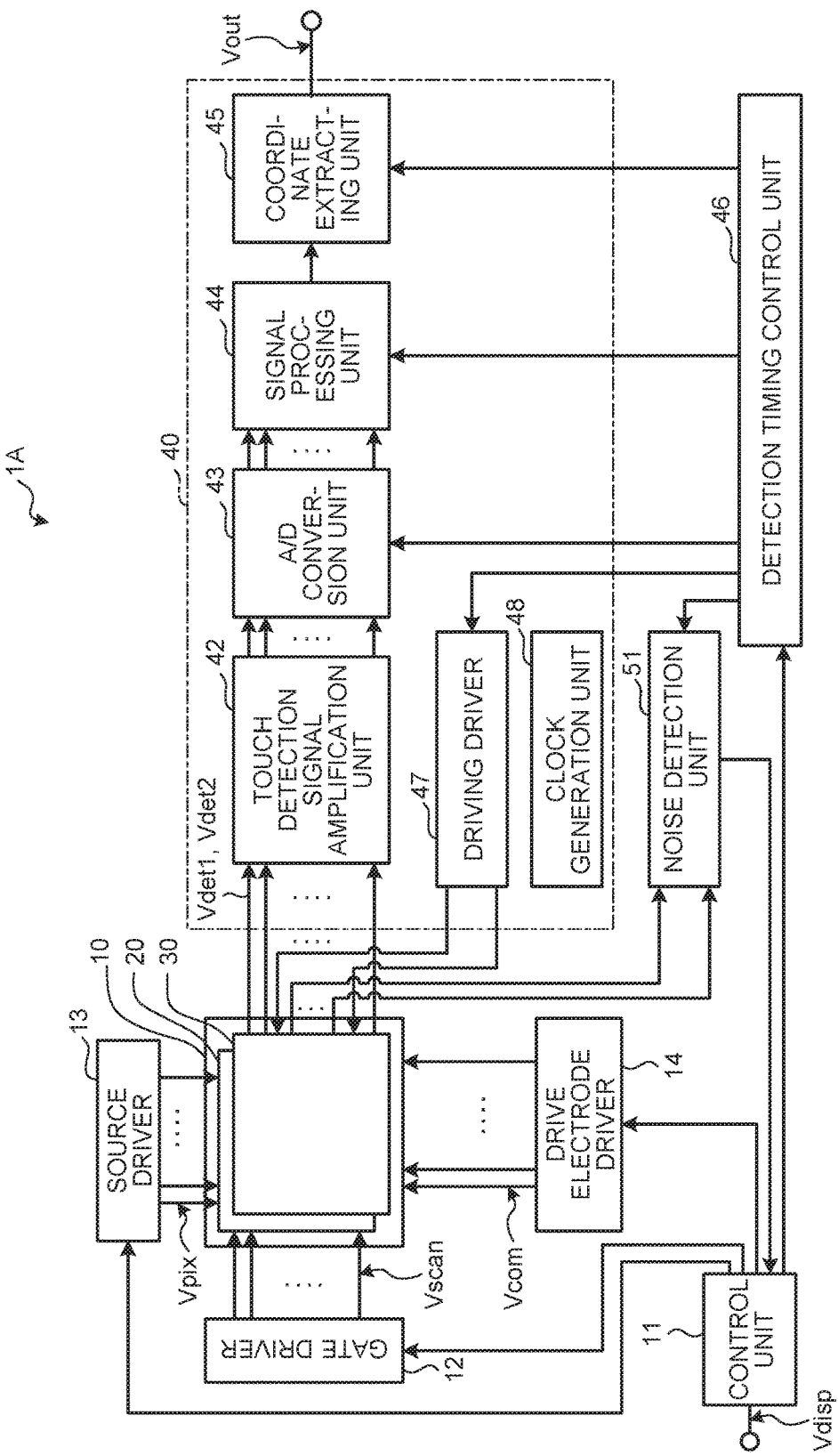
FIG. 25 is a block diagram illustrating a configuration example of a display device with a touch detection function according to a fourth embodiment.

FIG. 25 is a block diagram illustrating a configuration example of the display device with a touch detection function according to a fourth embodiment. A display device 1A with a touch detection function according to the present embodiment has a normal operation mode and a sleep mode. In the normal operation mode, in the same manner as the display device 1 with a touch detection function according to the first to third embodiments, a display operation for performing image display on the display panel 20 by operating an image display function and a touch detection operation for detecting a touch input on or to the touch panel 30 are performed in a time division manner The sleep mode includes a period in which the image display function is stopped, that is, image display on the display panel 20 is not performed and the touch detection operation is stopped. When there is no touch operation for a certain period of time in the normal operation mode, the display device 1A with a touch detection function proceeds to the sleep mode. When contact or proximity of a finger is detected in the sleep mode, the display device 1A with a touch detection function proceeds to the normal operation mode.

The touch panel 30 according to the present embodiment can perform a self-capacitive touch detection operation in addition to the mutual-capacitive touch detection operation described above. As illustrated in FIG. 25, the touch detection unit 40 includes a driving driver 47 for supplying a drive signal to the touch detection electrode TDL in performing the self-capacitive touch detection operation. The touch detection electrode TDL outputs a second touch detection signal Vdet2 corresponding to a self capacitance, and the second touch detection signal Vdet2 is supplied to the touch-detection-signal amplification unit 42. The A/D conversion unit 43, the signal processing unit 44, and the coordinate extracting unit 45 detect contact or proximity of a conductor such as a finger.

In the present embodiment, in the normal operation mode, mutual-capacitive touch detection is mainly performed to detect the coordinates of the touch input. In the sleep mode, self-capacitive touch detection is mainly performed to detect contact or proximity of an external conductor.

When the touch detection unit 40 performs the self-capacitive touch detection operation, the drive signal is supplied from the driving driver 47 to the touch detection electrode TDL. However, the drive electrode COML may be in a floating state in which the voltage signal is not applied and the electric potential is not fixed. A voltage signal at the same level as that of the drive signal supplied to the touch detection electrode TDL may be applied to the drive electrode COML at the same time.

Figure 26:
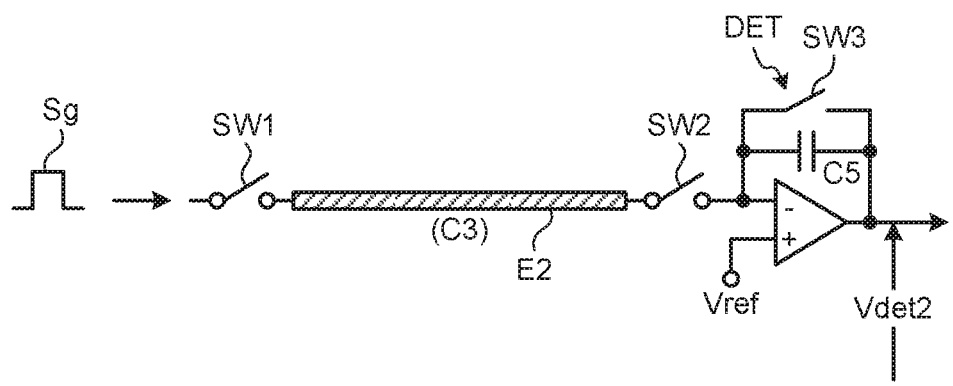
FIG. 26 is an explanatory diagram for explaining a basic principle of self-capacitive touch detection and illustrates a state in which a finger is in a non-contact state or a non-proximate state.
Figure 27:
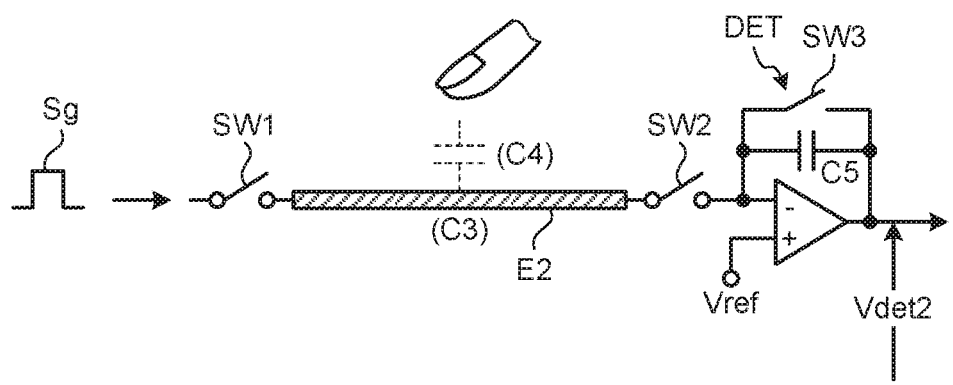
FIG. 27 is an explanatory diagram for explaining the basic principle of self-capacitive touch detection and illustrates a state in which the finger is in a contact state or a proximate state.
Figure 28:
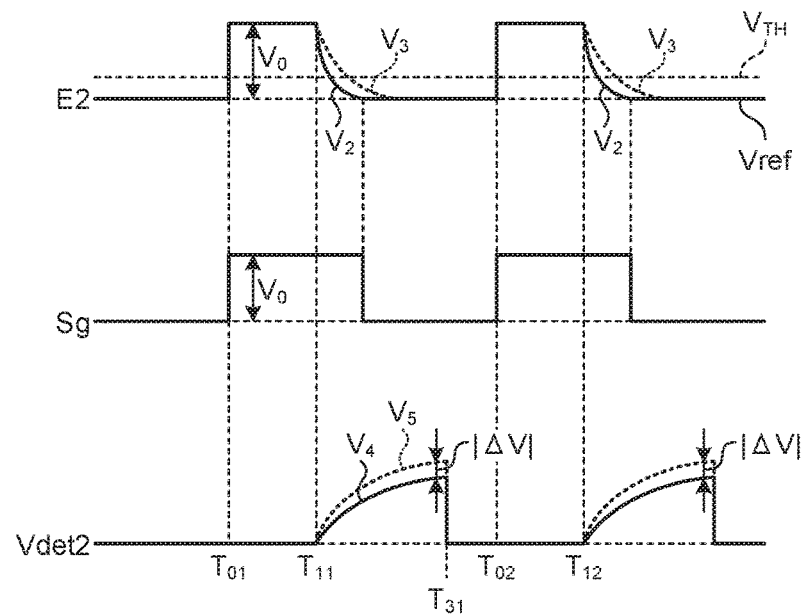
FIG. 28 is a diagram illustrating an example of waveforms of the drive signal and the touch detection signal.

Next, the following describes a basic principle of self-capacitive touch detection performed by the display device 1A with a touch detection function according to the present embodiment with reference to FIG. 26 to FIG. 28. FIG. 26 is an explanatory diagram for explaining the basic principle of self-capacitive touch detection and illustrates a state in which a finger is in a non-contact state or a non-proximate state. FIG. 27 is an explanatory diagram for explaining the basic principle of self-capacitive touch detection and illustrates a state in which the finger is in a contact state or a proximate state. FIG. 28 is a diagram illustrating an example of waveforms of the drive signal and the touch detection signal. FIGS. 26 and 27 also illustrate a detection circuit.

As illustrated in FIG. 26, in a state in which a finger is in a non-contact state or a non-proximate state, the AC rectangular wave Sg having a predetermined frequency (for example, about several kHz to several hundreds kHz) is applied to the touch detection electrode E2. The touch detection electrode E2 has a capacitance C3, and a current corresponding to the capacitance C3 flows therethrough. The voltage detector DET converts variation in the current corresponding to the AC rectangular wave Sg into variation in voltage (a waveform $V_4$ of a solid line (refer to FIG. 28)).

Next, as illustrated in FIG. 27, in a state in which a finger is in a contact state or a proximate state, a capacitance C4 between the finger and touch detection electrode E2 is added to the capacitance C3 of the touch detection electrode E2. Accordingly, when the AC rectangular wave Sg is applied to the touch detection electrode E2, a current corresponding to the capacitance C3 and the capacitance C4 flows therethrough. As illustrated in FIG. 28, the voltage detector DET converts variation in the current corresponding to the AC rectangular wave Sg into variation in voltage (a waveform $V_5$ of a dotted line). By integrating voltage values of the obtained waveform $V_4$ and waveform $V_5$ to compare the values with each other, it can be determined whether a finger is in contact with or proximate to the touch detection electrode E2. In FIG. 28, a period until the voltage is lowered to a predetermined reference voltage is obtained for each of the waveform $V_4$ and the waveform $V_5$, and the obtained periods may be compared with each other.

Specifically, as illustrated in FIGS. 26 and 27, the touch detection electrode E2 is configured to be disconnected from other elements with the switch SW1 and the switch SW2. In FIG. 28, at a timing of time $T_{01}$, a voltage level of the AC rectangular wave Sg is increased to a voltage level corresponding to a voltage $V_0$. At this point, the switch SW1 is on and the switch SW2 is off. Due to this, the voltage of the touch detection electrode E2 is increased to the voltage $V_0$. Next, the switch SW1 is turned off before a timing of time $T_{11}$. Although the touch detection electrode E2 is in a floating state at this point, the electric potential of the touch detection electrode E2 is kept at $V_0$ with the capacitance C3 (refer to FIG. 26) of the touch detection electrode E2 or a capacitance obtained by adding the capacitance C4 generated by contact or proximity of a finger and the like to the capacitance C3 of the touch detection electrode E2 (C3+C4, refer to FIG. 27). The switch SW3 is turned on before the timing of time $T_{11}$, and turned off after a predetermined time has elapsed to reset the voltage detector DET. Through this reset operation, the output voltage becomes substantially the same voltage as Vref.

Subsequently, when the switch SW2 is turned on at the timing of time $T_{11}$, a inverting input terminal of the voltage detector DET has the voltage $V_0$ of the touch detection electrode E2. Thereafter, the voltage of the inverting input terminal of the voltage detector DET is lowered to a reference voltage Vref in accordance with a time constant of the capacitance C3 (or C3+C4) of the touch detection electrode E2 and a capacitance C5 in the voltage detector DET. At this point, an electric charge accumulated in the capacitance C3 (or C3+C4) of the touch detection electrode E2 moves to the capacitance C5 in the voltage detector DET, so that the output of the voltage detector DET is increased (Vdet2). The output (Vdet2) of the voltage detector DET is represented as the waveform $V_4$ of a solid line when a finger and the like are not proximate to the touch detection electrode E2, and Vdet2=C3×$V_0$/C5 is satisfied. When a capacitance caused by a finger and the like is added, the output (Vdet2) is represented as the waveform $V_5$ of a dotted line, and Vdet2=(C3+C4)×$V_0$/C5 is satisfied.

Thereafter, the switch SW2 is turned off and the switch SW1 and the switch SW3 are turned on at a timing of time $T_{31}$ after the electric charge of the capacitance C3 (or C3+C4) of the touch detection electrode E2 sufficiently moves to the capacitance C5, and thus the electric potential of the touch detection electrode E2 is caused to be at a low level that is the same as the electric potential of the AC rectangular wave Sg, and the voltage detector DET is reset. In this case, a timing for turning on the switch SW1 may be any timing after the switch SW2 is turned off and before time $T_{02}$. A timing for resetting the voltage detector DET may be any timing after the switch SW2 is turned off and before time $T_{12}$. The above operation is repeated at a predetermined frequency (for example, about several kHz to several hundreds kHz). It can be measured whether there is an external proximity object (whether there is a touch operation) based on an absolute value|ΔV| of a difference between the waveform $V_4$ and the waveform $V_5$. As illustrated in FIG. 28, the electric potential of the touch detection electrode E2 is represented as the waveform $V_2$ when a finger and the like are in a non-proximate state, and represented as the waveform $V_3$ when the capacitance C4 caused by a finger and the like is added. It can be measured whether there is an external proximity object (whether there is a touch operation) by measuring a time until each of the waveform $V_2$ and the waveform $V_3$ is lowered to a predetermined voltage $V_{TH}$.

In the touch panel 30 according to the present embodiment, the electric charge is supplied to each touch detection electrode TDL in accordance with the drive signal supplied from the driving driver 47 illustrated in FIG. 25, and self-capacitive touch detection is performed. Each of a plurality of touch detection electrodes TDL outputs the second touch detection signal Vdet2 to the touch-detection-signal amplification unit 42. The A/D conversion unit 43 converts an analog signal that is output from the touch-detection-signal amplification unit 42 into a digital signal. The signal processing unit 44 receives a signal from the A/D conversion unit 43 to detect whether there is a touch input.

Figure 29:
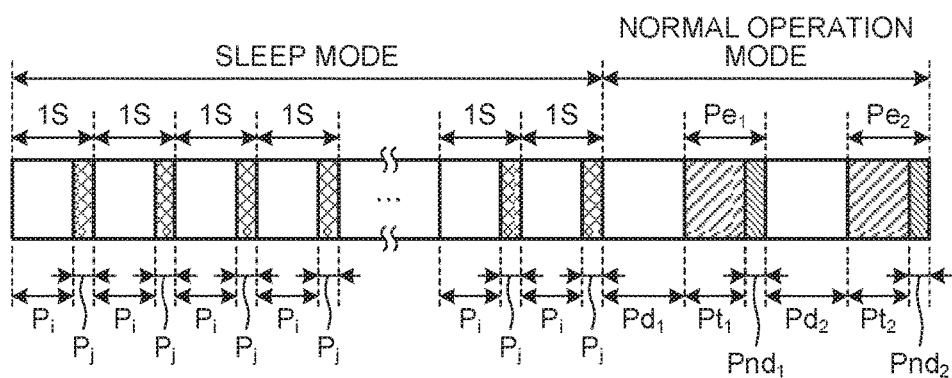
FIG. 29 is a schematic diagram for explaining an operation in a sleep mode and a normal operation mode according to the fourth embodiment.
Figure 30:
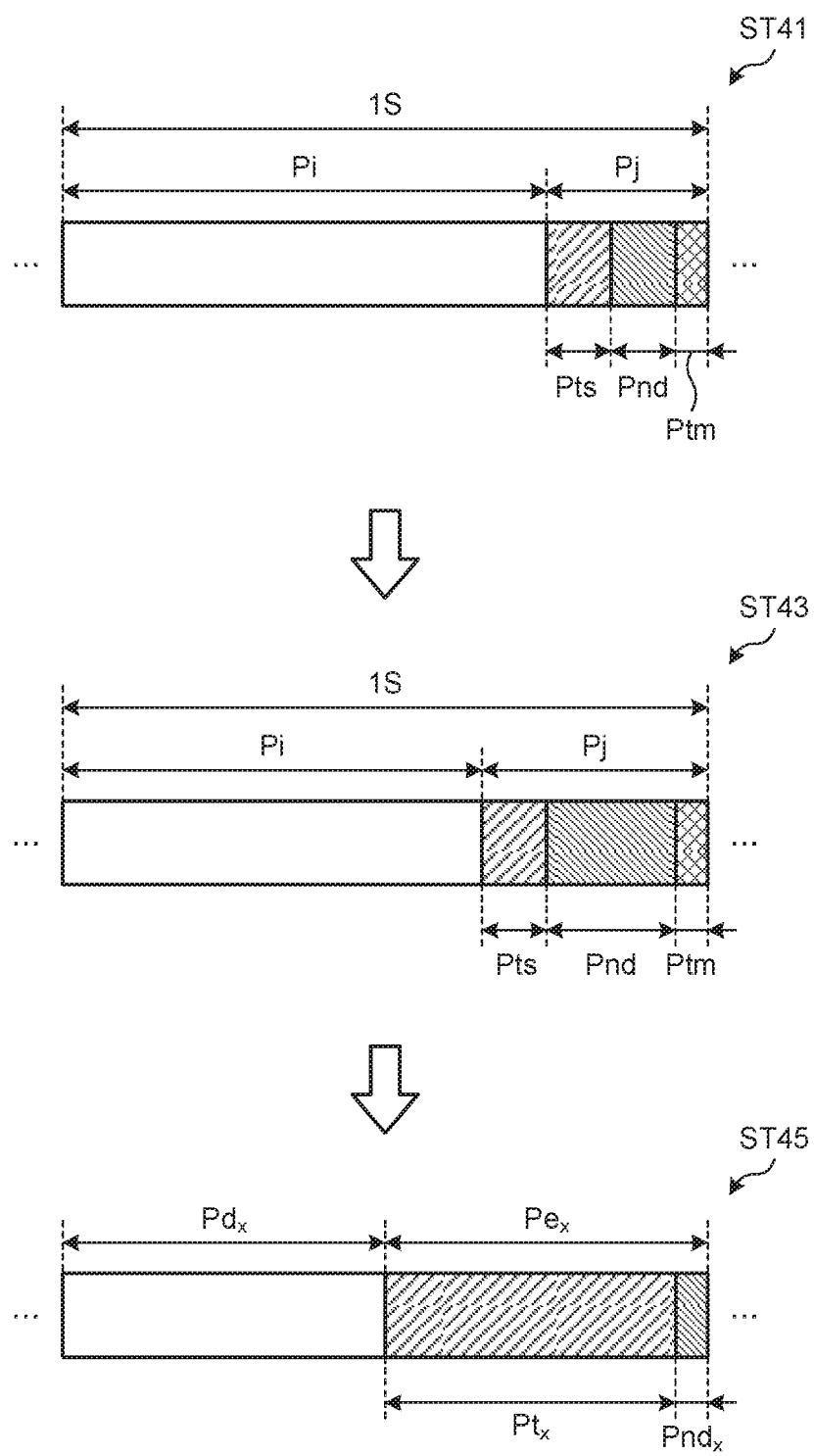
FIG. 30 is a schematic diagram for explaining a relation between an idling period, the touch detection period, and the noise detection period in a case of detecting a noise according to the fourth embodiment.
Figure 31:
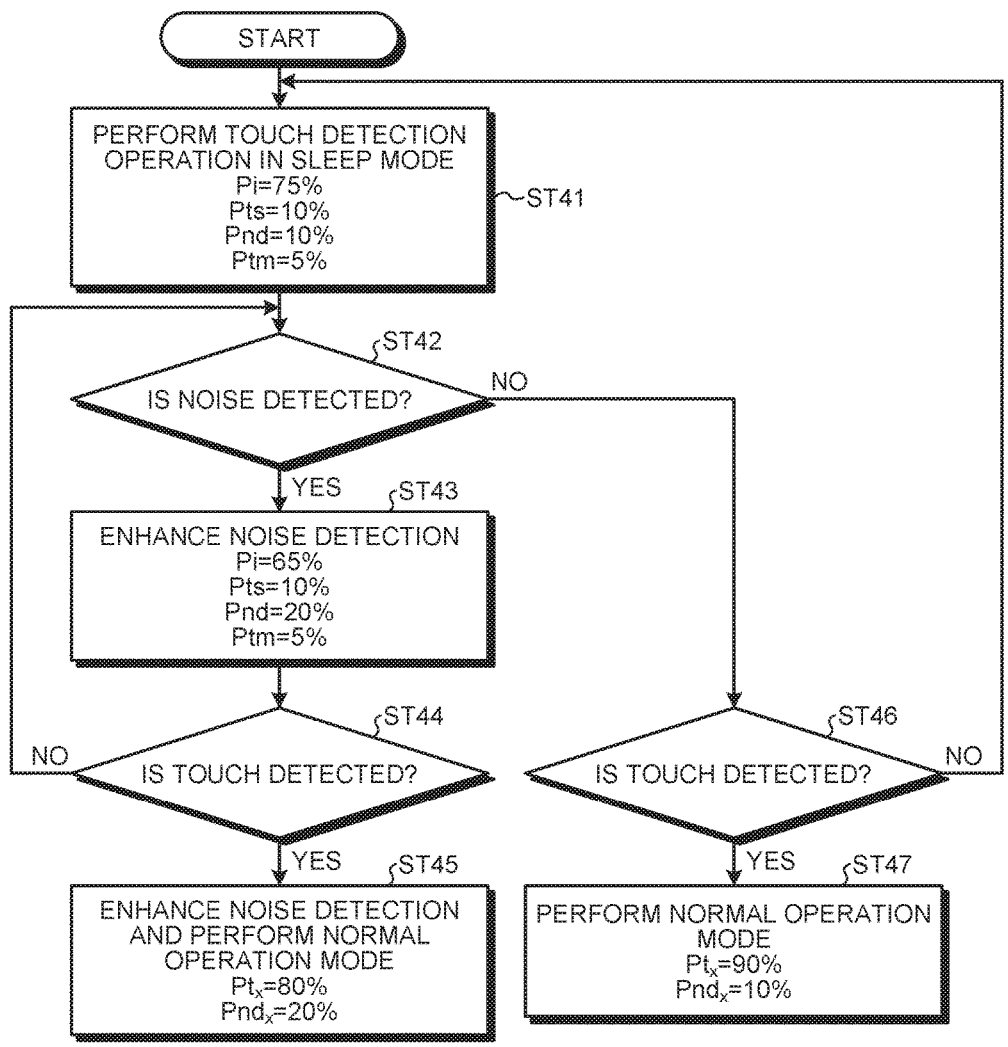
FIG. 31 is a flowchart for explaining the touch detection operation and the noise detection operation according to the fourth embodiment.

FIG. 29 is a schematic diagram for explaining an operation in the sleep mode and the normal operation mode according to the fourth embodiment. FIG. 30 is a schematic diagram for explaining a relation between an idling period, the touch detection period, and the noise detection period in a case of detecting a noise. FIG. 31 is a flowchart for explaining the touch detection operation and the noise detection operation.

As illustrated in FIG. 29, one sleep period (1S) is repeatedly arranged in the sleep mode. Each sleep period (1S) includes an idling period Pi in which the display operation, the touch detection operation, and the noise detection operation are not performed, and an idling stopping period Pj in which the display operation is not performed and the touch detection operation and the noise detection operation are performed. In the sleep mode, the idling period Pi and the idling stopping period Pj are alternately arranged. In the normal operation mode, the display operation period $Pd_x$ (x=1, 2, . . . n) and the detection operation period $Pe_x$ (x=1, 2, . . . n) described above are alternately arranged.

In the sleep mode, the display operation is not performed, so that the display control unit 11A (refer to FIG. 13), the gate driver 12, and the source driver 13 (refer to FIG. 25) do not operate, and thereby power consumption of the display device 1A with a touch detection function is reduced. One sleep period (1S) may have any length. The length may be different from or the same as that of a period obtained by adding the display operation period $Pd_x$ and the detection operation period $Pe_x$ together. In this case, one sleep period (1S) is set based on a reference clock of a clock generation unit 48 included in the touch detection unit 40.

As illustrated in FIG. 30, the idling period Pi and the idling stopping period Pj are arranged in one sleep period (1S). For example, the proportions of the idling period Pi and the idling stopping period Pj in one sleep period (1S) are 75% and 25%, respectively. In the idling stopping period Pj, a touch detection period Pts for performing self-capacitive touch detection, a noise detection period Pnd for performing noise detection, and a touch detection period Ptm for performing mutual-capacitive touch detection are arranged in different periods. The touch detection operation in the sleep mode is performed in the self-capacitive touch detection period Pts and the mutual-capacitive touch detection period Ptm in the idling stopping period Pj. In a state in which a noise in the sleep mode is not detected, the self-capacitive touch detection period Pts is 10%, the mutual-capacitive touch detection period Ptm is 5%, and the noise detection period Pnd is 10% for one sleep period (1S) (Step ST41 in FIG. 31).

The noise detection unit 51 performs the noise detection operation in the noise detection period Pnd in the sleep mode. When no noise is detected (No at Step ST42 in FIG. 31), the touch detection control unit 11B (refer to FIG. 13) repeatedly executes one sleep period (1S) in FIGS. 30 and at Step ST41 in FIG. 31. If the touch detection operation is performed in the self-capacitive touch detection period Pts in the idling stopping period Pj and the touch detection unit 40 detects contact or proximity of a finger (Yes at Step ST46 in FIG. 31), the control unit 11 proceeds to the normal operation mode (Step ST47 in FIG. 31). In this case, the proportions of the touch detection period $Pt_x$ and the noise detection period $Pnd_x$ in the detection operation period $Pe_x$ are 90% and 10%, respectively.

If the touch detection operation is performed in the self-capacitive touch detection period Pts in the idling stopping period Pj and the touch detection unit 40 does not detect contact or proximity of a finger (No at Step ST46 in FIG. 31), the control unit 11 continues the sleep mode. In this case, the touch detection operation in the sleep mode is performed while keeping the proportions of the self-capacitive touch detection period Pts, the mutual-capacitive touch detection period Ptm, and the noise detection period Pnd at 10%, 5%, and 10%, respectively.

If a noise is detected in the noise detection period Pnd in the sleep mode (Yes at Step ST42 in FIG. 31), the touch detection control unit 11B (refer to FIG. 13) enhances noise detection in one sleep period (1S) (FIG. 30, Step ST43 in FIG. 31). Specifically, the proportion of the noise detection period Pnd for one sleep period (1S) is increased from 10% to 20%. In this case, the proportion of the idling period Pi is reduced to be 65%, and the self-capacitive touch detection period Pts and the mutual-capacitive touch detection period Ptm are secured to be 10% and 5%, respectively.

If the touch detection unit 40 detects contact or proximity of a finger in the self-capacitive touch detection period Pts in the idling stopping period Pj (Yes at Step ST44 in FIG. 31), the control unit 11 proceeds to the normal operation mode in a state in which noise detection is enhanced. That is, the touch detection operation and the noise detection operation are started in a state in which the touch detection period $Pt_x$ is 80% and the noise detection period $Pnd_x$ is 20% with respect to the detection operation period $Pe_x$ (FIG. 30, Step ST45 in FIG. 31).

If the touch detection unit 40 does not detect contact or proximity of a finger in the self-capacitive touch detection period Pts in the idling stopping period Pj (No at Step ST44 in FIG. 31), the control unit 11 continues the sleep mode in a state in which noise detection is enhanced.

As described above, in the display device 1A with a touch detection function according to the present embodiment, the noise detection period Pnd is repeatedly arranged in the period in the sleep mode to enable noise detection in the sleep mode. In one sleep period (1S), the noise detection period Pnd is arranged in a period different from the self-capacitive touch detection period Pts and the mutual-capacitive touch detection period Ptm, so that the touch detection operation and the noise detection operation can be appropriately performed by enhancing noise detection, for example. When a noise is detected in the sleep mode, the mode proceeds to the normal operation mode in a state in which noise detection is enhanced, so that resistance to noise in the normal operation mode can be improved.

FIG. 30 and FIG. 31 exemplify a case of enhancing noise detection in the sleep mode. When the display device 1A with a touch detection function is used in an electrically low-noise environment and the noise detection unit 51 rarely detects a noise, power saving can be achieved by shortening the noise detection period Pnd and lengthening the idling period Pi. In the sleep mode, contact or proximity of a finger is detected in the self-capacitive touch detection period Pts. Alternatively, contact or proximity of a finger and movement of a finger such as a gesture may be detected in the mutual-capacitive touch detection period Ptm. The technologies described in the first embodiment to the third embodiment can be combined with the display device 1A with a touch detection function according to the fourth embodiment.

Fifth Embodiment

Figure 32:
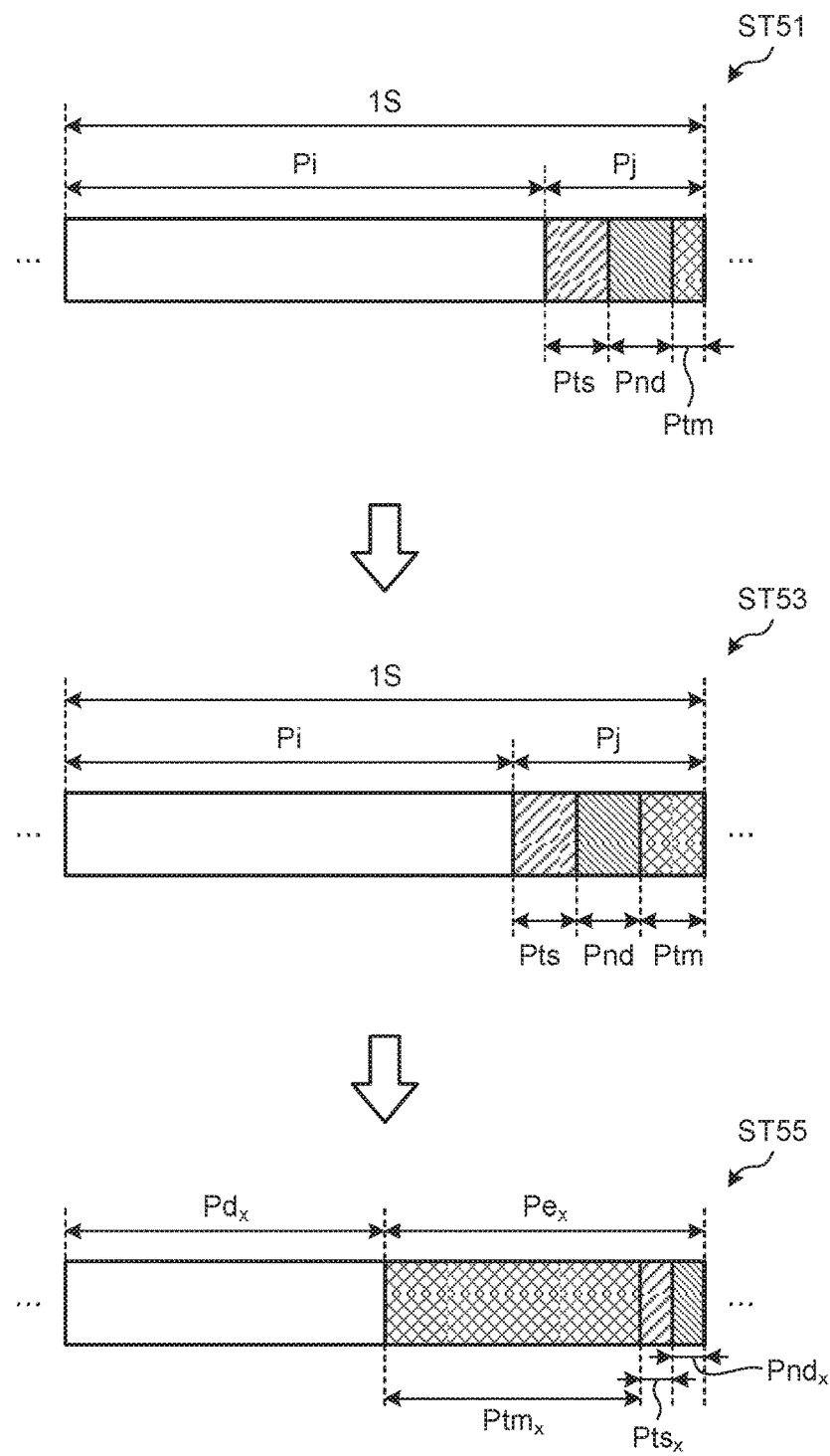
FIG. 32 is a schematic diagram for explaining a relation between the idling period, the touch detection period, and the noise detection period in a case of detecting adhesion of water in a display device with a touch detection function according to a fifth embodiment.
Figure 33:
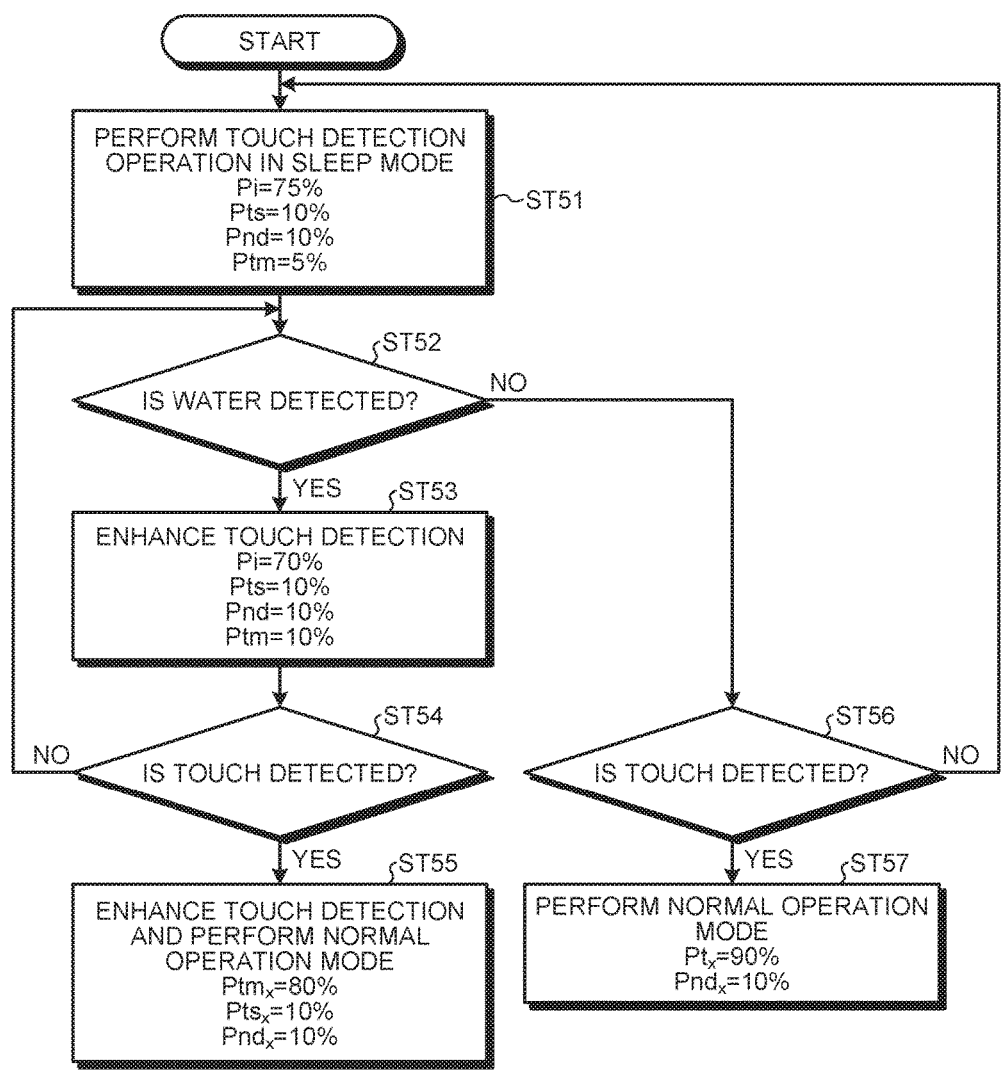
FIG. 33 is a flowchart for explaining the touch detection operation and the noise detection operation in a case in which water adheres to a touch detection surface.

FIG. 32 is a schematic diagram for explaining a relation between the idling period, the touch detection period, and the noise detection period in a case of detecting adhesion of water in the display device with a touch detection function according to a fifth embodiment. FIG. 33 is a flowchart for explaining the touch detection operation and the noise detection operation in a case in which water adheres to the touch detection surface.

The display device with a touch detection function according to the present embodiment has a configuration similar to that of the display device 1A with a touch detection function according to the fourth embodiment illustrated in FIG. 25, and has the normal operation mode and the sleep mode. In the sleep mode, the proportions of the idling period Pi and the idling stopping period Pj in one sleep period (1S) are 75% and 25%, respectively. The touch detection operation and the noise detection operation are performed in the idling stopping period Pj. With respect to one sleep period (1S), the proportions of the self-capacitive touch detection period Pts, the mutual-capacitive touch detection period Ptm, and the noise detection period Pnd are 10%, 5%, and 10%, respectively (FIG. 32, Step ST51 in FIG. 33).

Figure 34:
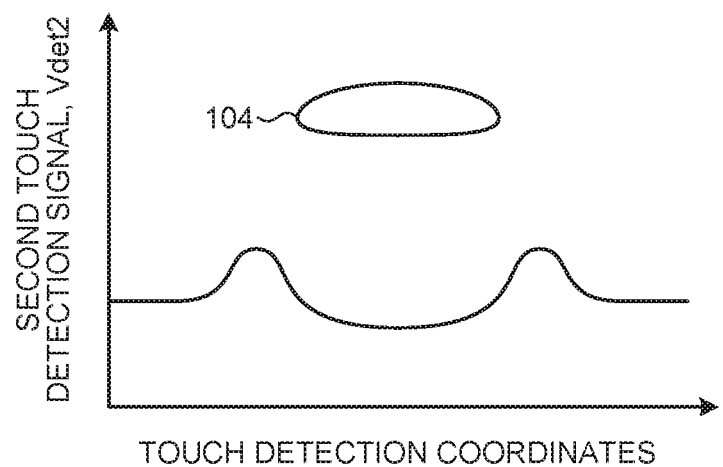
FIG. 34 is a graph schematically illustrating an example of a relation between a second touch detection signal and touch detection coordinates in a state in which water adheres to the touch detection surface.

The display device with a touch detection function according to the present embodiment can detect water adhering to the touch detection surface through the self-capacitive touch detection operation. FIG. 34 is a graph schematically illustrating an example of a relation between the second touch detection signal and the touch detection coordinates in a state in which water adheres to the touch detection surface. As illustrated in FIG. 34, a value of the second touch detection signal Vdet2 at the touch detection coordinates where water 104 is present is smaller than that at the touch detection coordinates where the water 104 is not present. The storage unit 11D (refer to FIG. 13) of the control unit 11 stores reference information that is data of a curve pattern representing a relation between the second touch detection signal Vdet2 and the touch detection coordinates. The determination unit 11C determines whether water is detected by comparing information about distribution of the second touch detection signals Vdet2 supplied from the touch detection unit 40 with the reference information of the storage unit 11D.

If water is not detected (No at Step ST52 in FIG. 33), the touch detection operation is performed in the self-capacitive touch detection period Pts and the mutual-capacitive touch detection period Ptm. If the touch detection unit 40 detects contact or proximity of a finger (Yes at Step ST56 in FIG. 33), the control unit 11 proceeds to the normal operation mode (Step ST57 in FIG. 33). In this case, the proportions of the touch detection period $Pt_x$ and the noise detection period $Pnd_x$ in the detection operation period $Pe_x$ are 90% and 10%, respectively.

If the touch detection unit 40 does not detect contact or proximity of a finger (No at Step ST56 in FIG. 33), the control unit 11 continues the sleep mode, and performs the touch detection operation in a state in which the self-capacitive touch detection period Pts is 10%, the mutual-capacitive touch detection period Ptm is 5%, and the noise detection period Pnd is 10%.

If water is detected (Yes at Step ST52 in FIG. 33), the touch detection control unit 11B (refer to FIG. 13) enhances touch detection and performs the touch detection operation in the sleep mode (Step ST53 in FIG. 33). In this case, the proportion of the mutual-capacitive touch detection period Ptm is increased from 5% to 10%, and the proportion of the idling period Pi is reduced from 75% to 70%.

Accordingly, touch detection is performed both in the self-capacitive touch detection period Pts and the mutual-capacitive touch detection period Ptm, and contact or proximity of a finger can be favorably detected even when water adheres to the surface.

If the touch detection unit 40 does not detect contact or proximity of a finger in the sleep mode (No at Step ST54 in FIG. 33), the control unit 11 continues the sleep mode. If the touch detection unit 40 detects contact or proximity of a finger (Yes at Step ST54 in FIG. 33), the control unit 11 enhances touch detection and proceeds to the normal operation mode (FIG. 32, Step ST55 in FIG. 33). In this case, the normal operation mode is performed in a state in which the mutual-capacitive touch detection period $Ptm_x$ is 80%, the self-capacitive touch detection period $Pts_x$ is 10%, and the noise detection period $Pnd_x$ is 10% in the detection operation period $Pe_x$. In this way, adhesion of water and contact or proximity of a conductor such as a finger can be detected by performing both of the mutual-capacitive touch detection operation and the self-capacitive touch detection operation in the normal operation mode. Accordingly, by comparing distribution of the second touch detection signals Vdet2 in a case in which water adheres to the surface with the first touch detection signal Vdet1 in a case in which a conductor such as a finger is in a contact state or a proximate state, a detection error of the coordinates at which a conductor such as a finger is in a contact state or a proximate state can be prevented.

As described above, according to the present embodiment, deterioration in detection sensitivity and a detection error of contact or proximity of a conductor such as a finger can be prevented even when water adheres to the touch detection surface by changing the proportions of the mutual-capacitive touch detection period $Ptm_x$, self-capacitive touch detection period $Pts_x$, and the noise detection period $Pnd_x$ in the normal operation period.

The present embodiment exemplifies a case in which water adheres to the touch detection surface. However, the embodiment is not limited thereto. A conductor other than water having lower conductivity than that of a finger or a nonconductor such as liquid may adhere thereto. The technology described in the fifth embodiment may be appropriately combined with the technologies described in the first embodiment to the fourth embodiment. For example, a function of performing the self-capacitive touch detection operation in addition to the mutual-capacitive touch detection operation to detect adhesion of water may be added to the display device with a touch detection function not having the sleep mode. In the fifth embodiment, the proportion of the noise detection period $Pnd_x$ may be changed, or the frequency of the drive signal may be changed.

Figure 35:
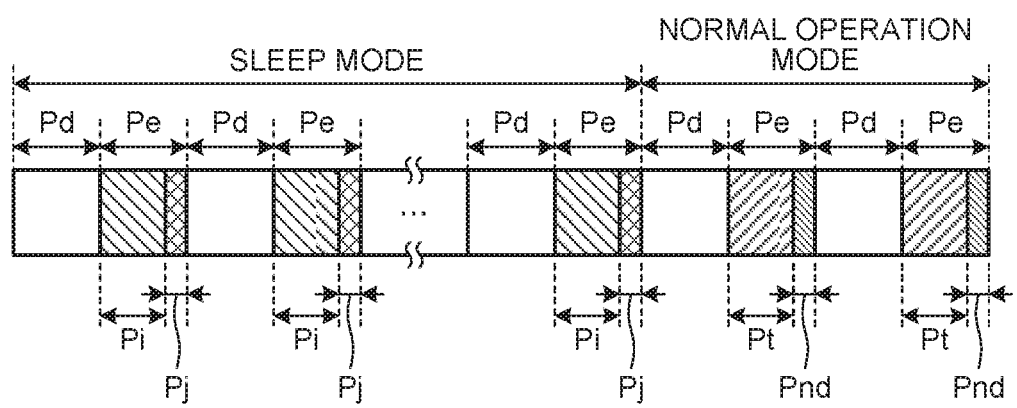
FIG. 35 is a schematic diagram for explaining an operation of a display device with a touch detection function according to a modification in a sleep mode and a normal operation mode.

The display device 1A with a touch detection function according to the fourth embodiment and the fifth embodiment stops the display operation in the sleep mode. However, the embodiment is not limited thereto. FIG. 35 is a schematic diagram for explaining an operation of the display device with a touch detection function according to a modification in the sleep mode and the normal operation mode. As illustrated in FIG. 35, in the present modification, the display operation period Pd for performing the display operation in the sleep mode and the detection operation period Pe for performing at least touch detection are repeatedly arranged. The detection operation period Pe includes the idling period Pi for stopping the display operation and stopping the touch detection operation. In this way, a period for performing the display operation and stopping the touch detection operation reduces power consumption can be reduced in the sleep mode. According to such an aspect, noise detection can be enhanced as described in the fourth embodiment, and adhesion of water can be detected and touch detection can be enhanced as described in the fifth embodiment.

The preferred embodiments of the present invention have been described above. However, the present invention is not limited thereto. Content disclosed in the embodiments is merely an example, and various modifications can be made without departing from the gist of the invention. The present invention naturally encompasses an appropriate modification maintaining the gist of the invention.

For example, the proportions of the touch detection period $Pt_x$, the noise detection period $Pnd_x$, and the like described in each embodiment are merely an example. The proportions can be changed depending on an external environment by lengthening or shortening the noise detection period $Pnd_x$, for example.

The drive electrode COML functions as the common electrode that gives a common potential to a plurality of pixels of the display panel 20, and also functions as the drive electrode of the touch panel 30. Alternatively, the touch panel 30 may be mounted on the display panel 20, and the common electrode of the display panel 20 and the drive electrode of the touch panel 30 may be separately arranged. In the self-capacitive touch detection operation, contact or proximity of an external conductor may be detected based on a self capacitance of the drive electrode COML. In this case, the driving driver 47 or the drive electrode driver 14 illustrated in FIG. 25 may supply the drive signal to the drive electrode COML.

What is claimed is:

1. A display device with a touch detection function, comprising:
    a plurality of pixel electrodes arranged in a matrix in a display region in which an image is displayed;
    a plurality of detection electrodes opposed to the pixel electrodes, the plurality of detection electrodes including a first detection electrode and a second detection electrode; and
    a detection circuit that is coupled to the plurality of detection electrodes,
    wherein
    one frame period for displaying an image corresponding to the display region includes a plurality of display operation periods, a plurality of detection periods for performing at least one of a mutual-capacitive detection mode and a self-capacitive detection mode, and at least one of noise detection periods,
    the plurality of pixel electrodes is configured to be driven in the plurality of display operation periods,
    the detection circuit is configured to control the mutual-capacitive detection mode, the self-capacitive detection mode, and a noise detection mode,
    in the mutual-capacitive detection mode, the first detection electrode is supplied with a touch detection drive signal and the second detection electrode is supplied with a touch detection signal based on capacitance between the first detection electrode and the second detection electrode,
    in the self-capacitive detection mode, the first detection electrode is supplied with the touch detection drive signal and the first detection electrode is supplied with a touch detection signal based on capacitance of the first detection electrode,
    in the noise detection mode, the first detection electrode is supplied with no touch drive signal, and at least one of the first detection electrode and the second detection electrode is supplied with a noise signal,
    in a first detection period, the detection circuit performs the mutual-capacitive detection mode and the self-capacitive detection mode, and determines whether water is detected, when the water is detected, the detection circuit performs the mutual-capacitive detection mode and the self-capacitive detection mode in a second detection period, a rate of a time period of the mutual-capacitive detection mode in the second detection period is greater than a rate of a time period of the mutual-capacitive detection mode in the first detection period.

2. The display device with a touch detection function according to claim 1, wherein
one of the at least one of noise detection periods is shorter than one of the detection periods.

3. The display device with a touch detection function according to claim 2, wherein
the plurality of detection electrodes include a drive electrode and a plurality of detection electrodes,
the touch detection drive signal is supplied to the drive electrode in the touch detection period, and
supply of the touch detection drive signal to the drive electrode is stopped in the noise detection period.

4. The display device with a touch detection function according to claim 1, wherein
the detection circuit is configured to detect a noise based on the noise signal, and
when the detection circuit detects a noise, a length of the at least one of noise detection periods is changed.

5. The display device with a touch detection function according to claim 3, wherein
the one frame period includes a plurality of noise detection periods, and
the detection circuit detects noises having different frequencies in the respective noise detection periods.

6. The display device with a touch detection function according to claim 5, wherein a frequency of the touch detection drive signal to be supplied to the detection electrodes is changed based on information about amplitudes of the detected noises having different frequencies.

7. The display device with a touch detection function according to claim 1, wherein the at least one of noise detection periods is changed based on information about distribution of touch detection signals in a touch detection surface with which touch detection is performed.

8. The display device with a touch detection function according to claim 1, wherein
the display device has a sleep mode in which an image display function is stopped, and a normal operation mode in which the display operation period and the detection period are performed in a time division manner, and
an idling period and the detection period are executed in a time division manner in the sleep mode, the idling period being a period in which a detection operation is not performed.

9. The display device with a touch detection function according to claim 8, wherein, when the detection circuit is configured to detect a noise based on the noise signal in the sleep mode, a length of the at least one of noise detection periods is changed.

10. The display device with a touch detection function according to claim 1, wherein, when a conductor having lower conductivity than that of a finger or a nonconductor is brought into contact with or proximate to the touch detection surface with which touch detection is performed, a time period of the mutual-capacitive detection mode or a time period of the self-capacitive detection mode in the detection period is changed.

11. The display device with a touch detection function according to claim 10, wherein all the detection periods included in the one frame period have the same length.

12. The display device with a touch detection function according to claim 1, wherein
the at least one of noise detection periods is a plurality of noise detection periods, and
the plurality of display periods, the plurality of detection periods, and the plurality of noise detection periods are included in the frame period.

13. The display device with a touch detection function according to claim 12, wherein
the one frame period is one of a first frame and a second frame,
in the first frame, the detection electrodes is supplied with a first detection drive signal which has a first frequency in the plurality of detection period, and the detection electrodes and the detection circuit supply a first noise signal; and
in the second frame, the detection electrodes is supplied with a second detection
drive signal which has a second frequency that is different from the first frequency in the plurality of the detection periods, and the detection electrodes and the detection circuit supply a first noise signal.

14. The display device with a touch detection function according to claim 1,
the voltage signal is supplied to the detection electrodes so that the detection electrodes have a fixed electric potential in the at least one of noise detection periods.

* * * * *